United States Patent
Boettcher et al.

(10) Patent No.: US 8,595,645 B2
(45) Date of Patent: Nov. 26, 2013

(54) DEVICE, METHOD, AND GRAPHICAL USER INTERFACE FOR MARQUEE SCROLLING WITHIN A DISPLAY AREA

(75) Inventors: Jesse William Boettcher, San Jose, CA (US); Benjamin Andrew Rottler, San Francisco, CA (US); Policarpo Bonilla Wood, Jr., San Francisco, CA (US); Bryan J. James, Menlo Park, CA (US); Jorge Fino, San Jose, CA (US); Eugene Dvortsov, San Jose, CA (US)

(73) Assignee: Apple Inc., Cupertino, CA (US)

( * ) Notice: Subject to any disclaimer, the term of this patent is extended or adjusted under 35 U.S.C. 154(b) by 294 days.

(21) Appl. No.: 12/722,428

(22) Filed: Mar. 11, 2010

(65) Prior Publication Data

US 2011/0225492 A1 Sep. 15, 2011

(51) Int. Cl.
*G06F 3/0485* (2013.01)
*G06F 3/04886* (2013.01)
*G06F 3/0482* (2013.01)

(52) U.S. Cl.
USPC ........... 715/785; 715/702; 715/773; 715/816; 715/825

(58) Field of Classification Search
USPC .......................... 715/702, 773, 785, 816, 825
See application file for complete search history.

(56) References Cited

U.S. PATENT DOCUMENTS

| | | | |
|---|---|---|---|
| 6,141,018 A | 10/2000 | Beri et al. | |
| 7,479,949 B2 | 1/2009 | Jobs et al. | |
| 2006/0038796 A1* | 2/2006 | Hinckley et al. | 345/173 |
| 2006/0048072 A1* | 3/2006 | Jarrett et al. | 715/784 |
| 2006/0242596 A1* | 10/2006 | Armstrong | 715/786 |
| 2008/0201650 A1* | 8/2008 | Lemay et al. | 715/763 |
| 2009/0058828 A1* | 3/2009 | Jiang et al. | 345/173 |
| 2010/0269038 A1* | 10/2010 | Tsuda | 715/702 |
| 2011/0090255 A1* | 4/2011 | Wilson et al. | 345/647 |

OTHER PUBLICATIONS

The Silky Smooth Marquee (publised on Sep. 10, 2008) http://.com/demo/marquee.html http://remysharp.com/2008/09/10/the-silky-smooth-marquee/.*

* cited by examiner

*Primary Examiner* — Alvin Tan
*Assistant Examiner* — Rinna Yi
(74) *Attorney, Agent, or Firm* — Morgan, Lewis & Bockius LLP

(57) ABSTRACT

A method, performed at a portable electronic device with a display and a touch-sensitive surface, includes displaying a list of items on the display. The method also includes displaying an item in the list with just a portion of the item visible on the display. The method further includes detecting a first gesture on the touch-sensitive surface at a location that corresponds to the item. The method further includes, in response to detecting the first gesture, marquee scrolling the item in a predefined marquee scrolling direction.

12 Claims, 37 Drawing Sheets

DEVICE, METHOD, AND GRAPHICAL USER INTERFACE FOR MARQUEE SCROLLING WITHIN A DISPLAY AREA

TECHNICAL FIELD

This relates generally to electronic devices with touch-sensitive surfaces, including but not limited to electronic devices with touch-sensitive surfaces that perform marquee scrolling of items within a display area.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manipulate user interface objects on a display.

Exemplary manipulations include selecting and/or performing one or more actions on one or more user interface objects, such as scrolling one or more objects. Exemplary user interface objects include text, digital images, icons, and other graphics. For portable devices with small displays, these objects may need to be scrolled to view various portions of an object.

One type of scrolling is marquee scrolling, in which text, images, and/or other objects scroll as if they were on a marquee. For example, in a handheld portable media player, marquee scrolling may be used to view file names and other information about the content on the player.

But existing methods for performing marquee scrolling are cumbersome and inefficient. For example, it may be unclear to a user what action(s) is/are required to perform marquee scrolling, which creates a significant cognitive burden on a user. In addition, existing methods take longer than necessary, thereby wasting energy. This latter consideration is particularly important in battery-operated devices.

SUMMARY

Accordingly, there is a need for electronic devices with faster, more efficient methods and interfaces for performing marquee scrolling of selected user interface objects. Such methods and interfaces may complement or replace conventional methods. Such methods and interfaces reduce the cognitive burden on a user and produce a more efficient human-machine interface. For battery-operated computing devices, such methods and interfaces conserve power and increase the time between battery charges.

The above deficiencies and other problems associated with user interfaces for computing devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device is a digital media player (e.g., iPod from Apple Inc. of Cupertino, Calif.). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions may include telephoning, e-mailing, instant messaging, workout support, digital photographing, digital videoing, web browsing, digital music playing, and/or digital video playing. Executable instructions for performing these functions may be included in a computer readable storage medium or other computer program product configured for execution by one or more processors.

In accordance with some embodiments, a method is performed at a portable electronic device with a display and a touch-sensitive surface. The method includes: displaying a list of items on the display, displaying an item in the list with just a portion of the item visible on the display, and detecting a first gesture on the touch-sensitive surface at a location that corresponds to the item. The method also includes, in response to detecting the first gesture, marquee scrolling the item in a predefined marquee scrolling direction.

In accordance with some embodiments, a portable electronic device includes a display, a touch-sensitive surface, one or more processors, memory, and one or more programs. The one or more programs are stored in the memory and configured to be executed by the one or more processors. The one or more programs include instructions for: displaying a list of items on the display, displaying an item in the list with just a portion of the item visible on the display, and detecting a first gesture on the touch-sensitive surface at a location that corresponds to the item. The one or more programs also include instructions for, in response to detecting the first gesture, marquee scrolling the item in a predefined marquee scrolling direction.

In accordance with some embodiments, a graphical user interface on a portable electronic device with a display, a touch-sensitive surface, a memory, and one or more processors to execute one or more programs stored in the memory includes a list of items on the display, and an item in the list with just a portion of the item visible on the display. In response to detecting a first gesture on the touch-sensitive surface at a location that corresponds to the item, the item is marquee scrolled in a predefined marquee scrolling direction.

In accordance with some embodiments, a computer readable storage medium has stored therein instructions, which when executed by a portable electronic device with a display and a touch-sensitive surface, cause the device to: display a list of items on the display, display an item in the list with just a portion of the item visible on the display, and detect a first gesture on the touch-sensitive surface at a location that corresponds to the item. The instructions also cause the device to, in response to detecting the first gesture, marquee scroll the item in a predefined marquee scrolling direction.

In accordance with some embodiments, a portable electronic device includes: a display, a touch-sensitive surface, means for displaying a list of items on the display, means for displaying an item in the list with just a portion of the item visible on the display, and means for detecting a first gesture on the touch-sensitive surface at a location that corresponds to the item. The portable electronic device also includes means, responsive to detecting the first gesture, for marquee scrolling the item in a predefined marquee scrolling direction.

In accordance with some embodiments, an information processing apparatus for use in a portable electronic device with a display and a touch-sensitive surface includes: means for displaying a list of items on the display, means for displaying an item in the list with just a portion of the item visible on the display, and means for detecting a first gesture on the touch-sensitive surface at a location that corresponds to the item. The information processing apparatus also includes means, responsive to detecting the first gesture, for marquee scrolling the item in a predefined marquee scrolling direction.

In accordance with some embodiments, a method is performed at a portable electronic device with a display and a touch-sensitive surface. The method includes: displaying a list of items on the display, visually distinguishing a predefined area of the display in which an item of the list is displayed from another area of the display in which other items of the list are displayed, and displaying an item with just a portion of the item visible on the display. The method also includes detecting a swipe gesture on the touch-sensitive surface, and, in response to detecting the swipe gesture, scrolling the list of items in accordance with the swipe gesture. The method further includes, when a location of the item corresponds to the predefined area, marquee scrolling the item.

In accordance with some embodiments, a portable electronic device includes a display, a touch-sensitive surface, one or more processors, memory, and one or more programs. The one or more programs are stored in the memory and configured to be executed by the one or more processors. The one or more programs include instructions for: displaying a list of items on the display, visually distinguishing a predefined area of the display in which an item of the list is displayed from another area of the display in which other items of the list are displayed, and displaying an item with just a portion of the item visible on the display. The one or more programs also include instructions for detecting a swipe gesture on the touch-sensitive surface, and, in response to detecting the swipe gesture, scrolling the list of items in accordance with the swipe gesture. The one or more programs further include instructions for, when a location of the item corresponds to the predefined area, marquee scrolling the item.

In accordance with some embodiments, a graphical user interface on a portable electronic device with a display, a touch-sensitive surface, a memory, and one or more processors to execute one or more programs stored in the memory includes a list of items on the display, a predefined area of the display in which an item of the list is visually distinguished from another area of the display in which other items of the list are displayed, and an item with just a portion of the item visible on the display. In response to detecting a swipe gesture on the touch-sensitive surface, the list of items is scrolled in accordance with the swipe gesture. When a location of the item corresponds to the predefined area, the item is marquee scrolled.

In accordance with some embodiments, a computer readable storage medium has stored therein instructions, which when executed by a portable electronic device with a display and a touch-sensitive surface, cause the device to: display a list of items on the display, visually distinguish a predefined area of the display in which an item of the list is displayed from another area of the display in which other items of the list are displayed, and display an item with just a portion of the item visible on the display. The instructions also cause the device to detect a swipe gesture on the touch-sensitive surface, and, in response to detecting the swipe gesture, scroll the list of items in accordance with the swipe gesture. The instructions further cause the device to, when a location of the item corresponds to the predefined area, marquee scroll the item.

In accordance with some embodiments, a portable electronic device includes: a display, a touch-sensitive surface, means for displaying a list of items on the display, means for visually distinguishing a predefined area of the display in which an item of the list is displayed from another area of the display in which other items of the list are displayed, and means for displaying an item with just a portion of the item visible on the display. The portable electronic device also includes means for detecting a swipe gesture on the touch-sensitive surface, and, means, responsive to detecting the swipe gesture, for scrolling the list of items in accordance with the swipe gesture. The portable electronic device further includes means, enabled when a location of the item corresponds to the predefined area, for marquee scrolling the item.

In accordance with some embodiments, an information processing apparatus for use in a portable electronic device with a display and a touch-sensitive surface includes: means for displaying a list of items on the display, means for visually distinguishing a predefined area of the display in which an item of the list is displayed from another area of the display in which other items of the list are displayed, and means for displaying an item with just a portion of the item visible on the display. The information processing apparatus also includes means for detecting a swipe gesture on the touch-sensitive surface, and means, responsive to detecting the swipe gesture, for scrolling the list of items in accordance with the swipe gesture. The information processing apparatus further includes means, enabled when a location of the item corresponds to the predefined area, for marquee scrolling the item.

In accordance with some embodiments, a method is performed at a portable electronic device with a display and a touch-sensitive surface. The method includes: displaying a list of items on the display, displaying an item in the list with only a portion of the item visible on the display, and detecting a first gesture on the touch-sensitive surface. The method also includes, in response to detecting the first gesture, when the first gesture is a right-to-left swipe gesture at a location that corresponds to the item, marquee scrolling the item. The method further includes, when the first gesture is a vertical swipe gesture, scrolling the list of items in accordance with the vertical swipe gesture. The method further includes, when the first gesture is a tap gesture at a location that corresponds to the item, performing a predefined action on the item.

In accordance with some embodiments, a portable electronic device includes a display, a touch-sensitive surface, one or more processors, memory, and one or more programs. The one or more programs are stored in the memory and configured to be executed by the one or more processors. The one or more programs include instructions for: displaying a list of items on the display, displaying an item in the list with only a portion of the item visible on the display, and detecting a first gesture on the touch-sensitive surface. The one or more programs also include instructions for, in response to detecting the first gesture, when the first gesture is a right-to-left swipe gesture at a location that corresponds to the item, marquee scrolling the item. The one or more programs further include, when the first gesture is a vertical swipe gesture, scrolling the list of items in accordance with the vertical swipe gesture. The one or more programs further include, when the first gesture is a tap gesture at a location that corresponds to the item, performing a predefined action on the item.

In accordance with some embodiments, a graphical user interface on a portable electronic device with a display, a touch-sensitive surface, a memory, and one or more processors to execute one or more programs stored in the memory includes a list of items on the display, and an item in the list with only a portion of the item visible on the display. In response to detecting a first gesture on the touch-sensitive surface, when the first gesture is a right-to-left swipe gesture at a location that corresponds to the item, the item is marquee scrolled. When the first gesture is a vertical swipe gesture, the list of items is scrolled in accordance with the vertical swipe gesture. When the first gesture is a tap gesture at a location that corresponds to the item, a predefined action is performed on the item.

In accordance with some embodiments, a computer readable storage medium has stored therein instructions, which when executed by a portable electronic device with a display and a touch-sensitive surface, cause the device to: display a list of items on the display, display an item in the list with only a portion of the item visible on the display, and detect a first gesture on the touch-sensitive surface. The instructions also cause the device to, in response to detecting the first gesture, when the first gesture is a right-to-left swipe gesture at a location that corresponds to the item, marquee scroll the item. The instructions further cause the device to, when the first gesture is a vertical swipe gesture, scroll the list of items on the display in accordance with the vertical swipe gesture. The instructions further cause the device to, when the first gesture is a tap gesture at a location that corresponds to the item, perform a predefined action on the item.

In accordance with some embodiments, a portable electronic device includes: a display, a touch-sensitive surface, means for displaying a list of items on the display, means for displaying an item in the list with only a portion of the item visible on the display, and means for detecting a first gesture on the touch-sensitive surface. The portable electronic device also includes means, responsive to detecting the first gesture, including: means, enabled when the first gesture is a right-to-left swipe gesture at a location that corresponds to the item, for marquee scrolling the item; means, enabled when the first gesture is a vertical swipe gesture, for scrolling the list of items in accordance with the vertical swipe gesture; and means, enabled when the first gesture is a tap gesture at a location that corresponds to the item, for performing a predefined action on the item.

In accordance with some embodiments, an information processing apparatus for use in a portable electronic device with a display and a touch-sensitive surface includes: means for displaying a list of items on the display, means for displaying an item in the list with only a portion of the item visible on the display, and means for detecting a first gesture on the touch-sensitive surface. The information processing apparatus also includes means, responsive to detecting the first gesture, including: means, enabled when the first gesture is a right-to-left swipe gesture at a location that corresponds to the item, for marquee scrolling the item; means, enabled when the first gesture is a vertical swipe gesture, for scrolling the list of items in accordance with the vertical swipe gesture; and means, enabled when the first gesture is a tap gesture at a location that corresponds to the item, for performing a predefined action on the item.

Thus, portable electronic devices with displays and touch-sensitive surfaces are provided with faster, more efficient methods and interfaces for marquee scrolling of user interface objects, thereby increasing the effectiveness, efficiency, and user satisfaction with such devices. Such methods and interfaces may complement or replace conventional methods for performing marquee scrolling.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1A:
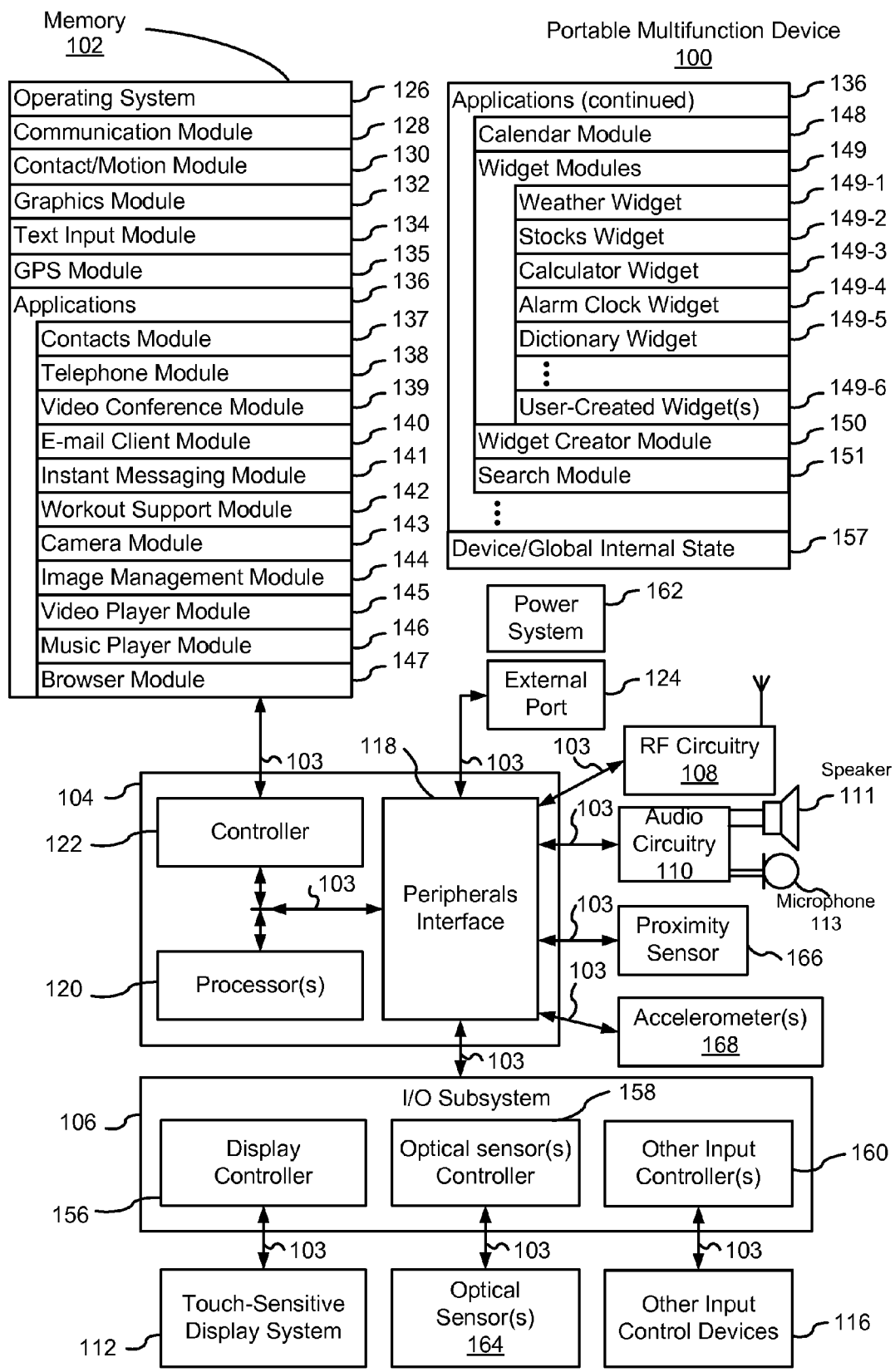
FIGS. 1A and 1B are block diagrams illustrating portable multifunction devices with touch-sensitive displays in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

As used herein, the term "resolution" of a display refers to the number of pixels (also called "pixel counts" or "pixel resolution") along each axis or in each dimension of the display. For example, a display may have a resolution of 320×480 pixels. Furthermore, as used herein, the term "resolution" of a multifunction device refers to the resolution of a display in the multifunction device. The term "resolution" does not imply any limitations on the size of each pixel or the spacing of pixels. For example, compared to a first display with a 1024×768-pixel resolution, a second display with a 320×480-pixel resolution has a lower resolution. However, it should be noted that the physical size of a display depends not only on the pixel resolution, but also on many other factors, including the pixel size and the spacing of pixels. Therefore, the first display may have the same, smaller, or larger physical size, compared to the second display.

As used herein, the term "video resolution" of a display refers to the density of pixels along each axis or in each dimension of the display. The video resolution is often measured in a dots-per-inch (DPI) unit, which counts the number of pixels that can be placed in a line within the span of one inch along a respective dimension of the display.

Embodiments of computing devices, user interfaces for such devices, and associated processes for using such devices are described. In some embodiments, the computing device is a portable communications device, such as a mobile telephone, that also contains other functions, such as PDA and/or music player functions. Exemplary embodiments of portable multifunction devices include, without limitation, the iPhone® and iPod Touch® devices from Apple Inc. of Cupertino, Calif. Other portable devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad).

In the discussion that follows, a computing device that includes a display and a touch-sensitive surface is described. It should be understood, however, that the computing device may include one or more other physical user-interface devices, such as a physical keyboard, a mouse and/or a joystick.

The device supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and U.S. patent application Ser. No. 11/459,615, "Touch Screen Keyboards For Portable Electronic Devices," filed Jul. 24, 2006, the contents of which are hereby incorporated by reference in their entireties. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
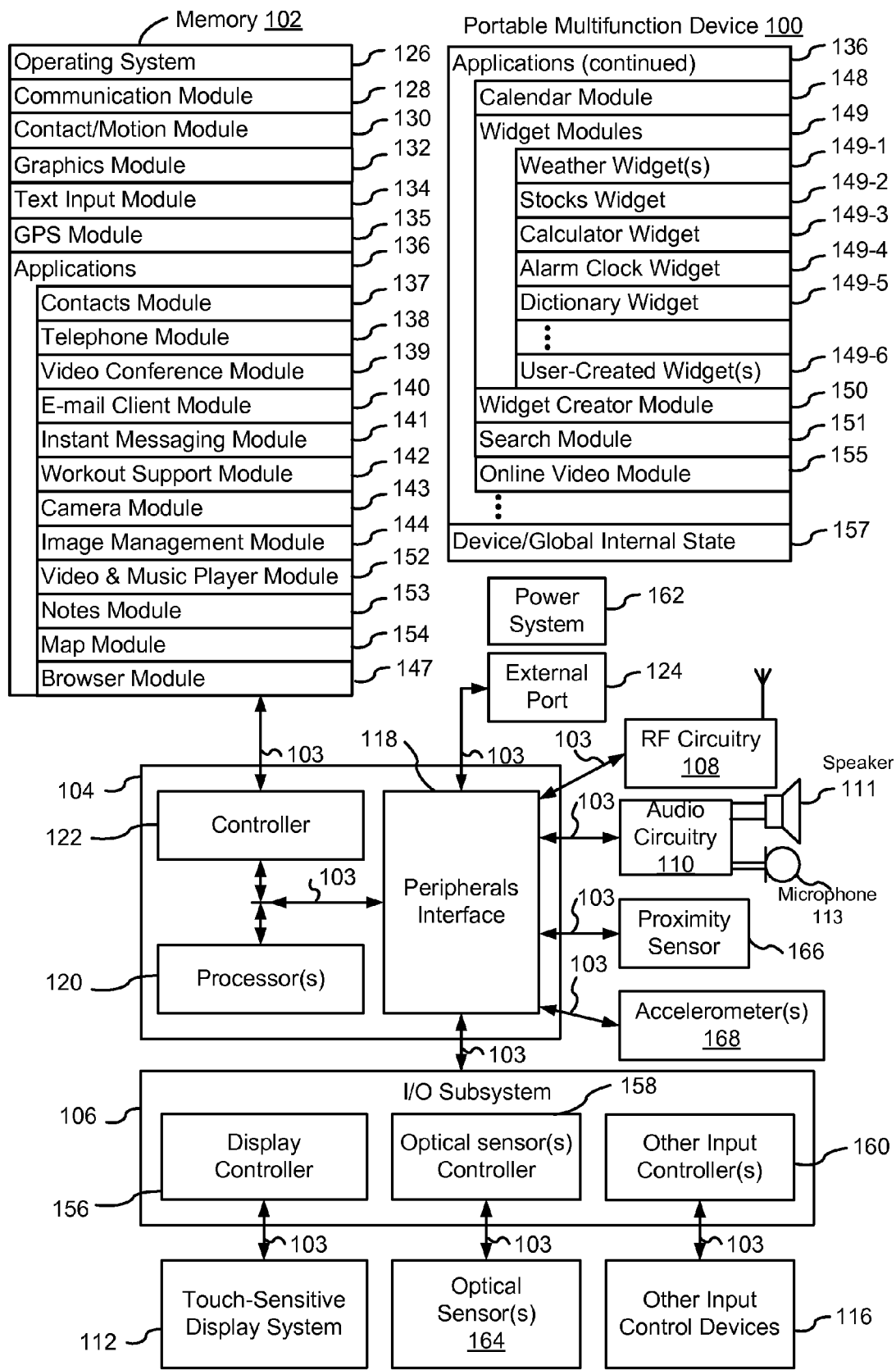

Attention is now directed toward embodiments of portable devices with touch-sensitive displays. FIGS. 1A and 1B are block diagrams illustrating portable multifunction devices 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIGS. 1A and 1B may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2). A quick press of the push button may disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button (e.g., 206) may turn power to device 100 on or off. The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 may be analogous to the multi-touch sensitive touchpads described in the following U.S. Pat. Nos. 6,323, 846 (Westerman et al.), 6,570,557 (Westerman et al.), and/or 6,677,932 (Westerman), and/or U.S. Patent Publication 2002/0015024A1, each of which is hereby incorporated by reference in its entirety. However, touch screen 112 displays visual output from portable device 100, whereas touch sensitive touchpads do not provide visual output.

A touch-sensitive display in some embodiments of touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903, 964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

In some embodiments, device 100 may include a physical or virtual wheel (e.g., a click wheel) as input control device 116. A user may navigate among and interact with one or more graphical objects (e.g., icons) displayed in touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by input controller 160 as well as one or more of the modules and/or sets of instructions in memory 102. For a virtual click wheel, the click wheel and click wheel controller may be part of touch screen 112 and display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIGS. 1A and 1B show an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, an optical sensor is located on the front of the device so that the user's image may be obtained for videoconferencing while the user views the other video conference participants on the touch screen display. In some embodiments, the position of optical sensor 164 can be changed by the user (e.g., by rotating the lens and the sensor in the device housing) so that a single optical sensor 164 may be used along with the touch screen display for both video conferencing and still and/or video image acquisition.

Device 100 may also include one or more proximity sensors 166. FIGS. 1A and 1B show proximity sensor 166 coupled to peripherals interface 118. Alternately, proximity sensor 166 may be coupled to input controller 160 in I/O subsystem 106. Proximity sensor 166 may perform as described in U.S. patent application Ser. No. 11/241,839, "Proximity Detector In Handheld Device"; U.S. patent application Ser. No. 11/240,788, "Proximity Detector In Handheld Device"; U.S. patent application Ser. No. 11/620,702, "Using Ambient Light Sensor To Augment Proximity Sensor Output"; U.S. patent application Ser. No. 11/586,862, "Automated Response To And Sensing Of User Activity In Portable Devices"; and U.S. patent application Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 may also include one or more accelerometers 168. FIGS. 1A and 1B show accelerometer 168 coupled to peripherals interface 118. Alternately, accelerometer 168 may be coupled to an input controller 160 in I/O subsystem 106. Accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
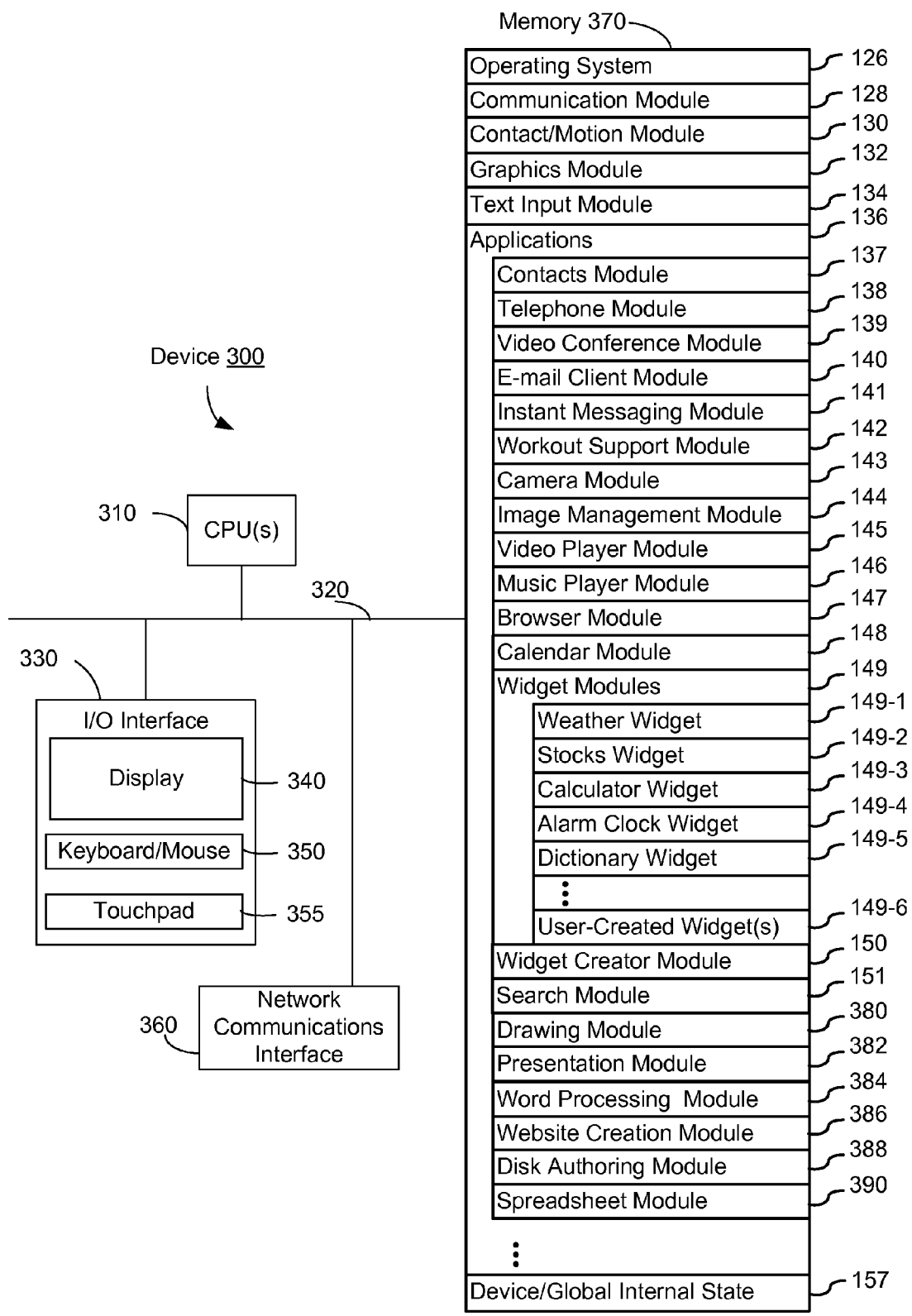
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A, 1B and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detects contact on a touchpad. In some embodiments, contact/motion module 130 and controller 160 detects contact on a click wheel.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. As used herein, the terms "swipe gesture," "pan gesture," and "flick gesture" are used interchangeably.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:

contacts module 137 (sometimes called an address book or contact list);
telephone module 138;
video conferencing module 139;
e-mail client module 140;
instant messaging (IM) module 141;
workout support module 142;
camera module 143 for still and/or video images;
image management module 144;
video player module 145;
music player module 146;
browser module 147;
calendar module 148;
widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
widget creator module 150 for making user-created widgets 149-6;
search module 151;
video and music player module 152, which merges video player module 145 and music player module 146;
notes module 153;
map module 154; and/or
online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with touch screen 112, display controller 156, contact module 130, graphics module 132, audio circuitry 110, and speaker 111, video player module 145 includes executable instructions to display, present or otherwise play back videos (e.g., on touch screen 112 or on an external, connected display via external port 124).

In conjunction with touch screen 112, display system controller 156, contact module 130, graphics module 132, audio circuitry 110, speaker 111, RF circuitry 108, and browser module 147, music player module 146 includes executable instructions that allow the user to download and play back recorded music and other sound files stored in one or more file formats, such as MP3 or AAC files. In some embodiments, device 100 may include the functionality of an MP3 player, such as an iPod (trademark of Apple Inc.).

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the content of which is hereby incorporated by reference in its entirety.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

Figure 1C:
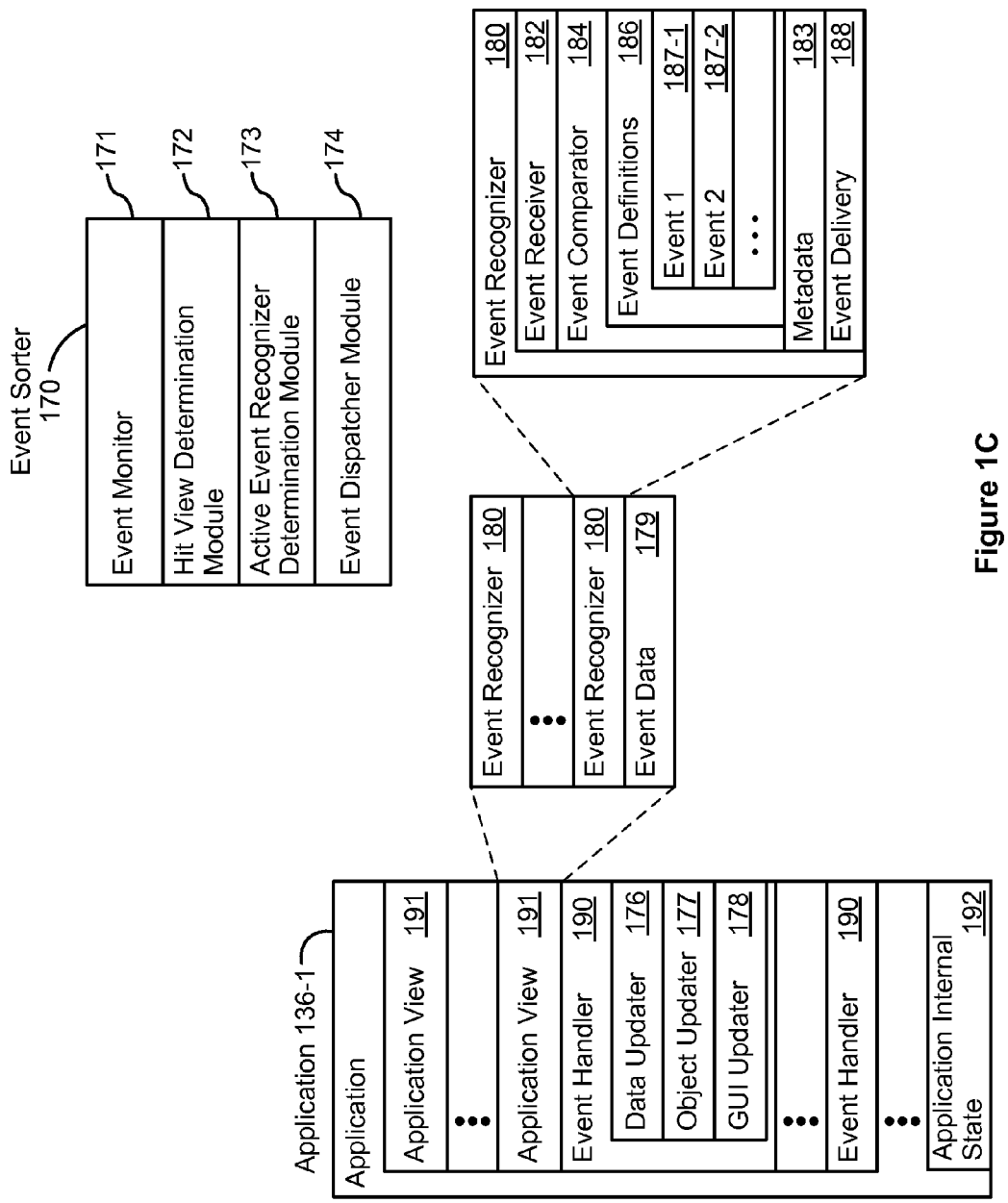
FIG. 1C is a block diagram illustrating exemplary components for event handling in accordance with some embodiments.

FIG. 1C is a block diagram illustrating exemplary components for event handling in accordance with some embodiments. In some embodiments, memory 102 (in FIGS. 1A and 1B) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is(are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

Figure 2:
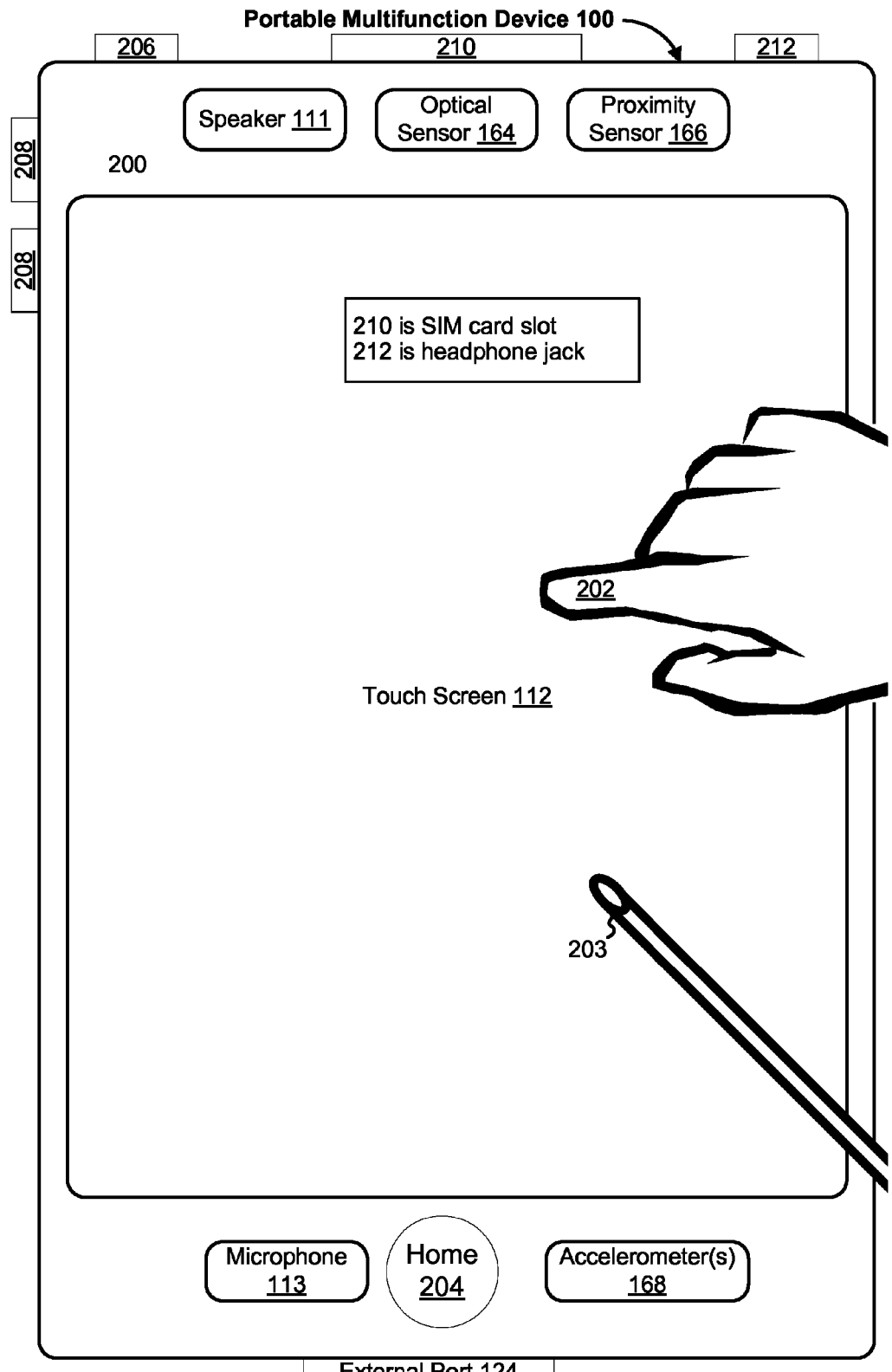
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with device 100. In some embodiments, inadvertent contact with a graphic may not select the graphic. For example, a swipe gesture that sweeps over an application icon may not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 may include circuitry (sometimes called a chipset) that interconnects and controls communications between system components. Device 300 includes input/output (I/O) interface 330 comprising display 340, which is typically a touch screen display. I/O interface 330 also may include a keyboard and/or mouse (or other pointing device) 350 and touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from CPU(s) 310. In some embodiments, memory 370 stores programs, modules, and data structures analogous to the programs, modules, and data structures stored in memory 102 of portable multifunction device 100 (FIG. 1), or a subset thereof. Furthermore, memory 370 may store additional programs, modules, and data structures not present in memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on portable multifunction device 100.

Figure 4A:
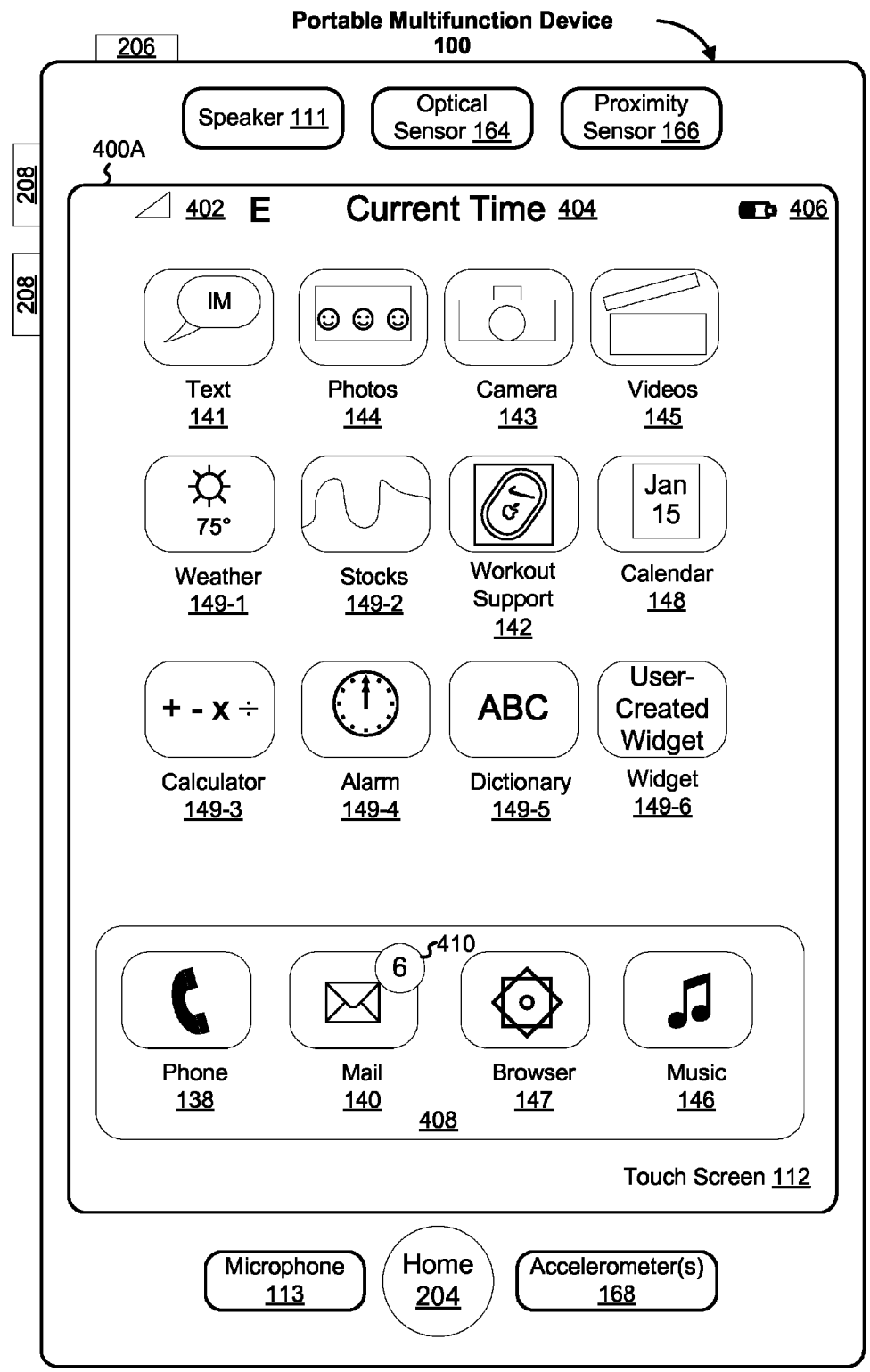
FIGS. 4A and 4B illustrate exemplary user interfaces for a menu of applications on a portable multifunction device in accordance with some embodiments.
Figure 4B:
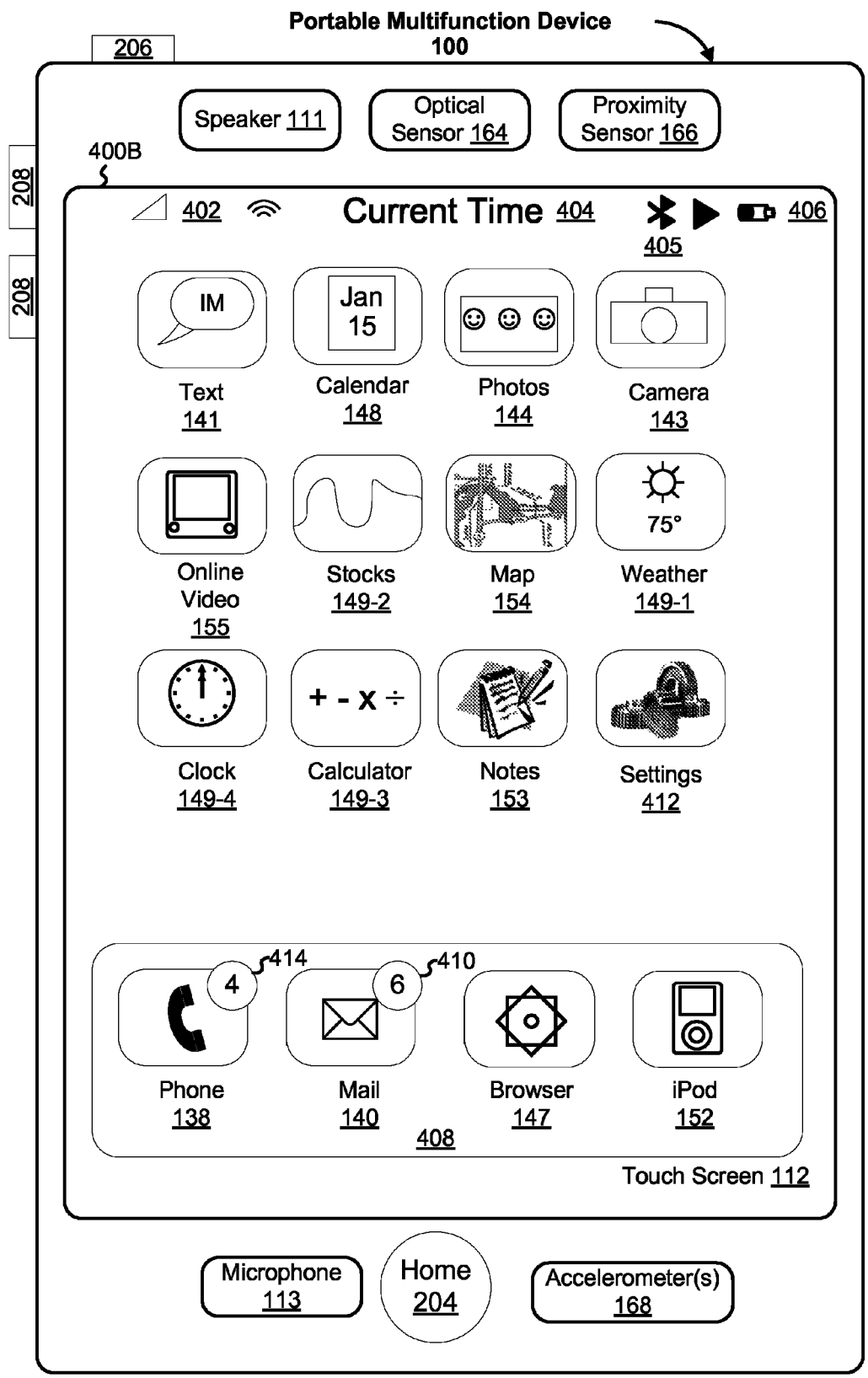

FIGS. 4A and 4B illustrate exemplary user interfaces for a menu of applications on portable multifunction device 100 in accordance with some embodiments. Similar user interfaces may be implemented on device 300. In some embodiments, user interface 400A includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Phone 138, which may include an indicator 414 of the number of missed calls or voicemail messages;
  E-mail client 140, which may include an indicator 410 of the number of unread e-mails;
  Browser 147; and
  Music player 146; and
Icons for other applications, such as:
  IM 141;
  Image management 144;
  Camera 143;
  Video player 145;
  Weather 149-1;
  Stocks 149-2;
  Workout support 142;
  Calendar 148;
  Calculator 149-3;
  Alarm clock 149-4;
  Dictionary 149-5; and
  User-created widget 149-6.

In some embodiments, user interface 400B includes the following elements, or a subset or superset thereof:
402, 404, 405, 406, 141, 148, 144, 143, 149-3, 149-2, 149-1, 149-4, 410, 414, 138, 140, and 147, as described above;
Map 154;
Notes 153;
Settings 412, which provides access to settings for device 100 and its various applications 136, as described further below;
Video and music player module 152, also referred to as iPod (trademark of Apple Inc.) module 152; and
Online video module 155, also referred to as YouTube (trademark of Google Inc.) module 155.

Figure 4C:
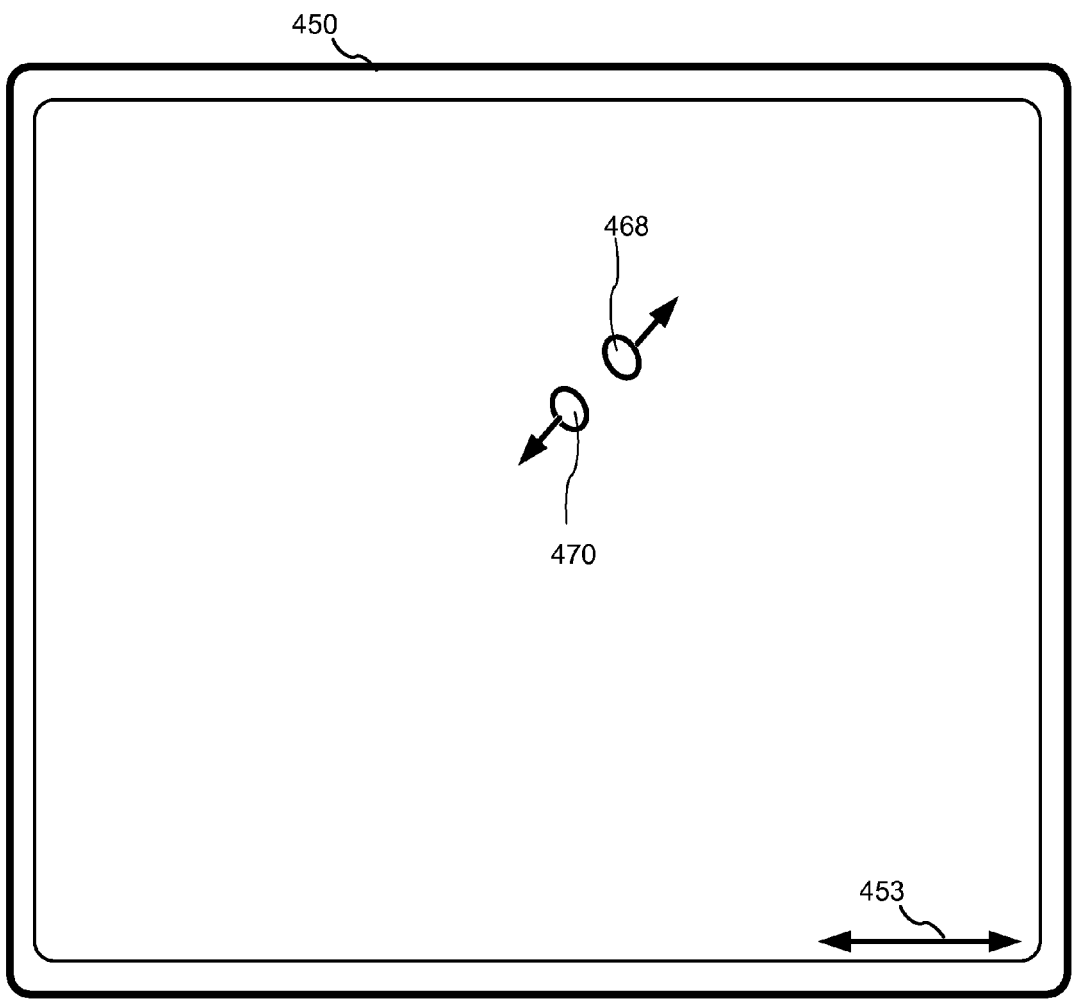
FIG. 4C illustrates an exemplary user interface for a multifunction device with a touch-sensitive surface that is separate from the display in accordance with some embodiments.
Figure 4C:
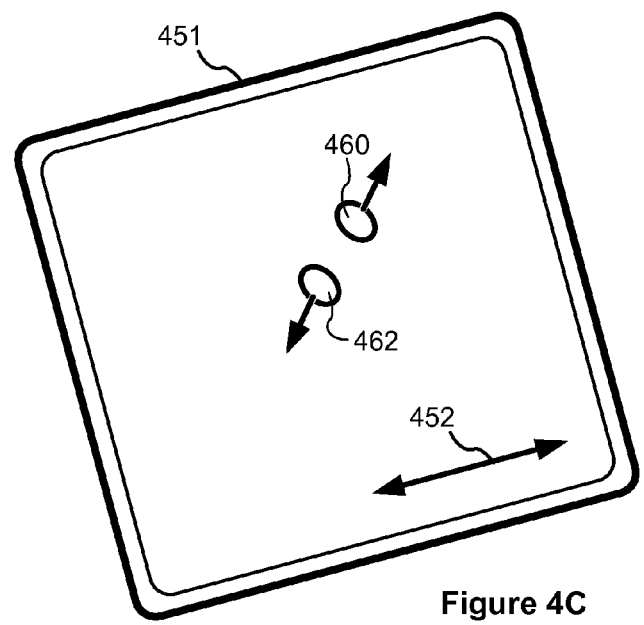

FIG. 4C illustrates an exemplary user interface on a device (e.g., device 300, FIG. 3) with a touch-sensitive surface 451 (e.g., a tablet, touchpad, or click wheel 355, FIG. 3) that is separate from the display 450 (e.g., touch screen display 112). Although many of the examples which follow will be given with reference to inputs on touch screen display 112 (where the touch sensitive surface and the display are combined), in some embodiments, the device detects inputs on a touch-sensitive surface that is separate from the display, as shown in FIG. 4C. In some embodiments the touch sensitive surface (e.g., 451 in FIG. 4C) has a primary axis (e.g., 452 in FIG. 4C) that corresponds to a primary axis (e.g., 453 in FIG. 4C) on the display (e.g., 450). In accordance with these embodiments, the device detects contacts (e.g., 460 and 462 in FIG. 4C) with the touch-sensitive surface 451 at locations that correspond to respective locations on the display (e.g., in FIG. 4C 460 corresponds to 468 and 462 corresponds to 470). In this way, user inputs (e.g., contacts 460 and 462, and movements thereof) detected by the device on the touch-sensitive surface (e.g., 451 in FIG. 4C) are used by the device to manipulate the user interface on the display (e.g., 450 in FIG. 4C) of the multifunction device when the touch-sensitive surface is separate from the display. It should be understood that similar methods may be used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a stylus input).

Attention is now directed towards embodiments of user interfaces ("UI") and associated processes that may be implemented on a multifunction device with a display and a touch-sensitive surface, such as device 300 or portable multifunction device 100.

Figure 5A:
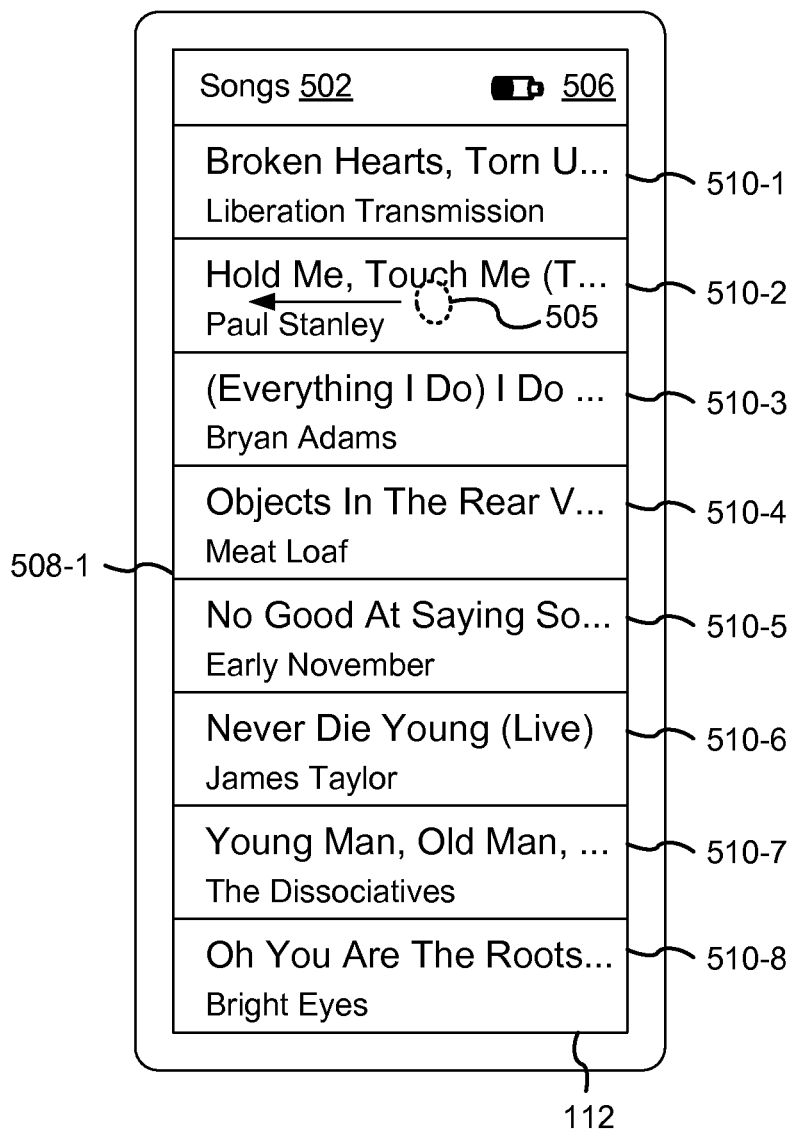
FIGS. 5A-5Y illustrate exemplary user interfaces for marquee scrolling in accordance with some embodiments.
Figure 5B:
Figure 5C:
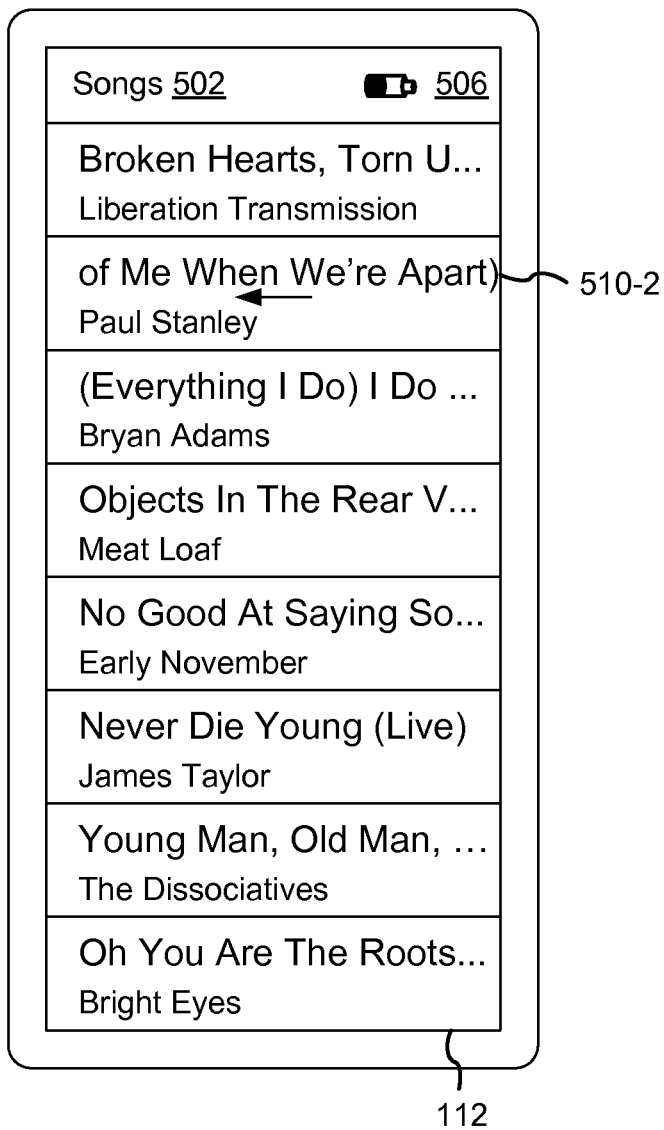
Figure 5D:
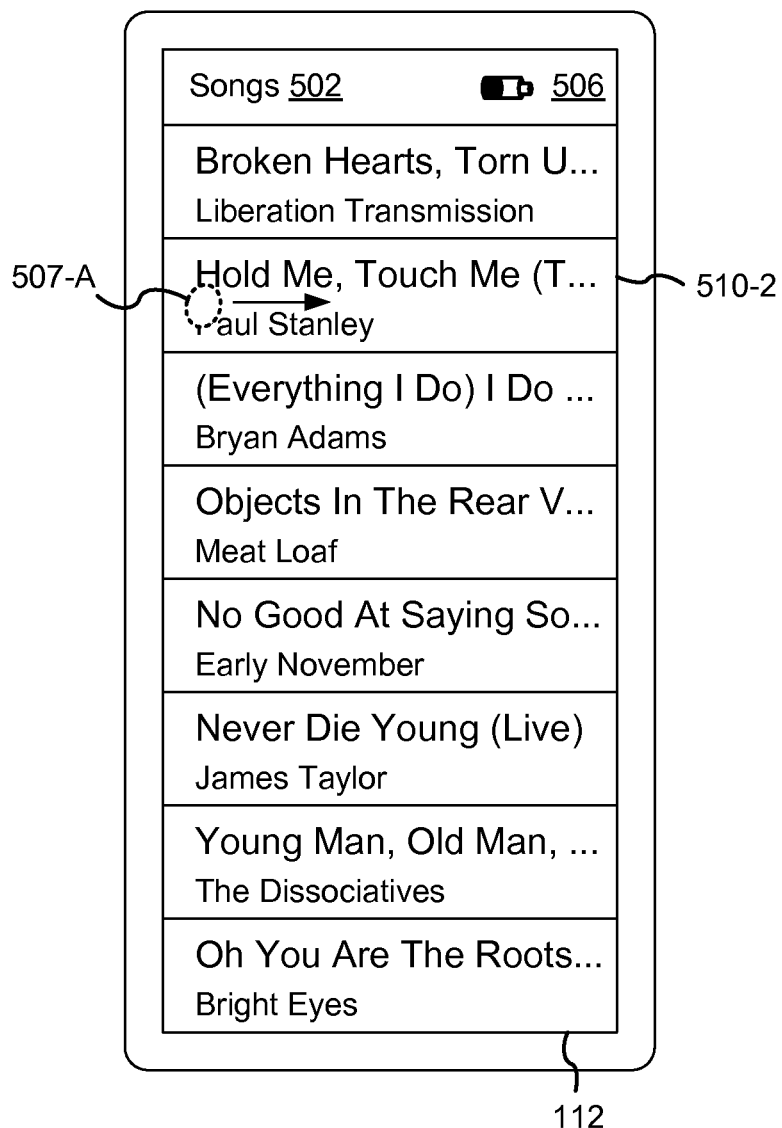
Figure 5E:
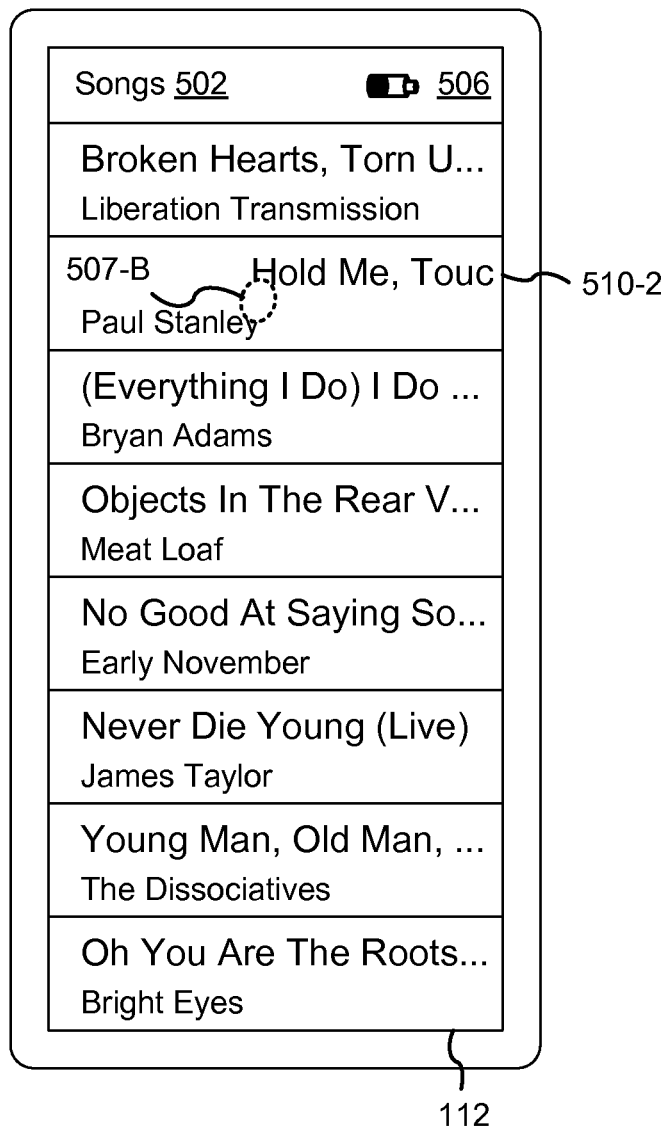
Figure 5F:
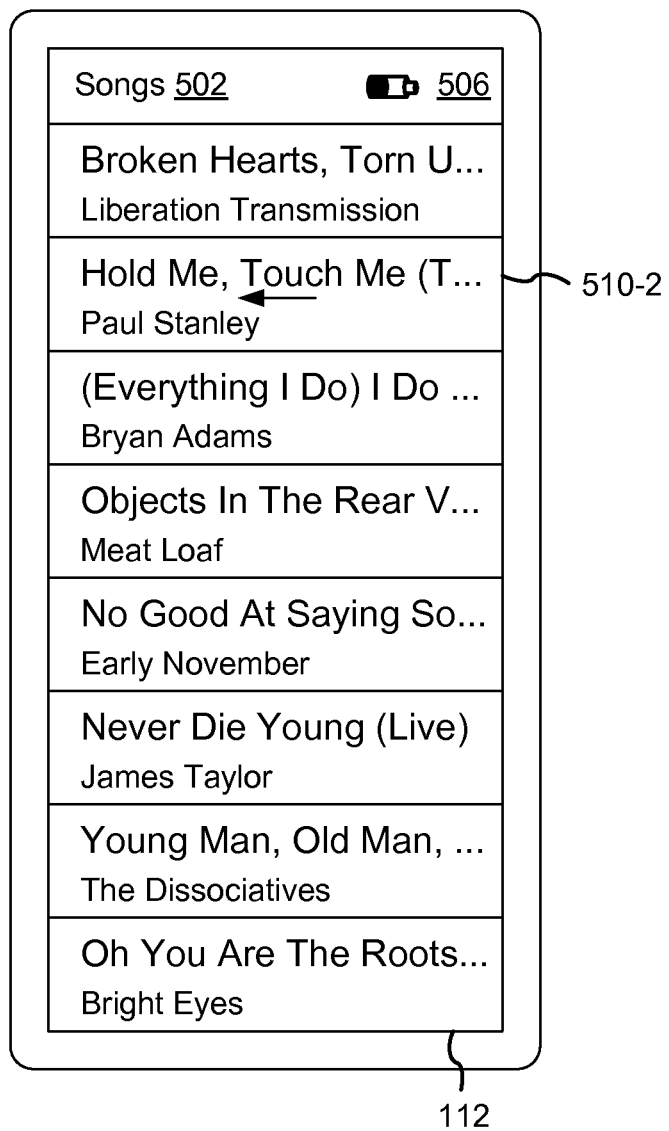
Figure 5G:
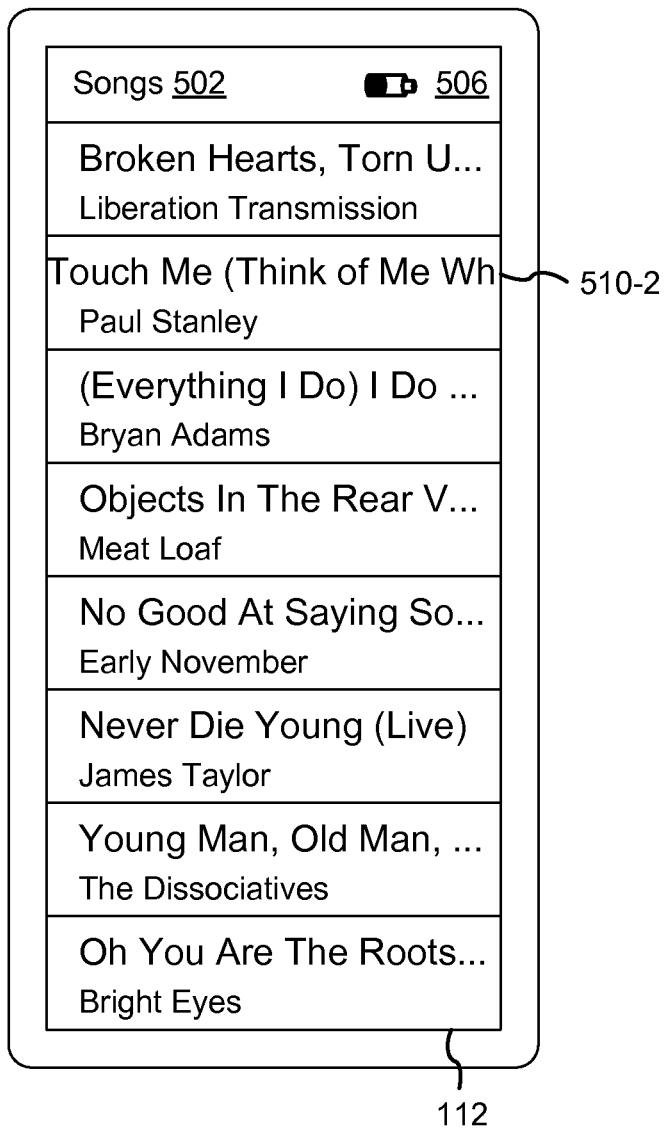
Figure 5H:
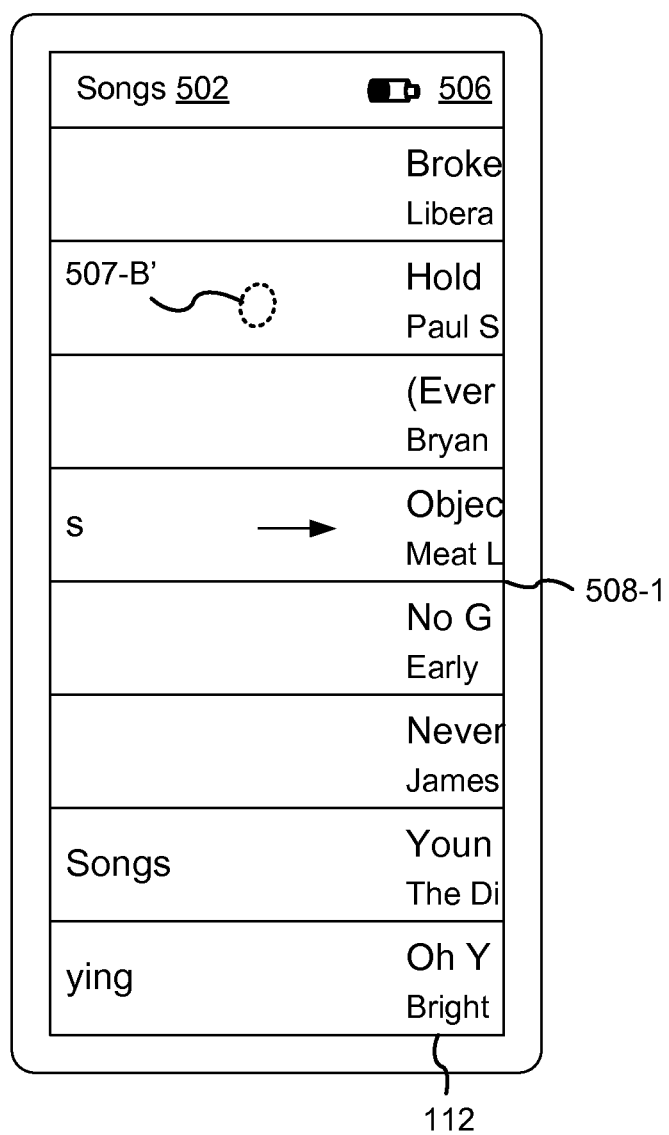
Figure 5I:
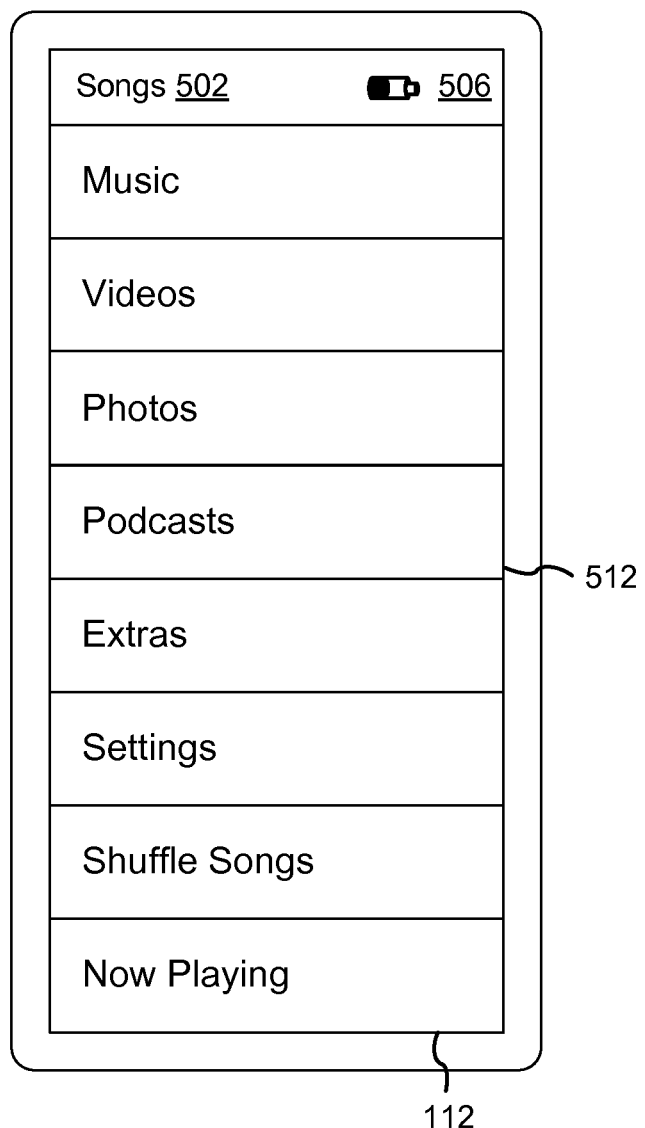
Figure 5J:
Figure 5K:
Figure 5L:
Figure 5M:
Figure 5N:
Figure 5O:
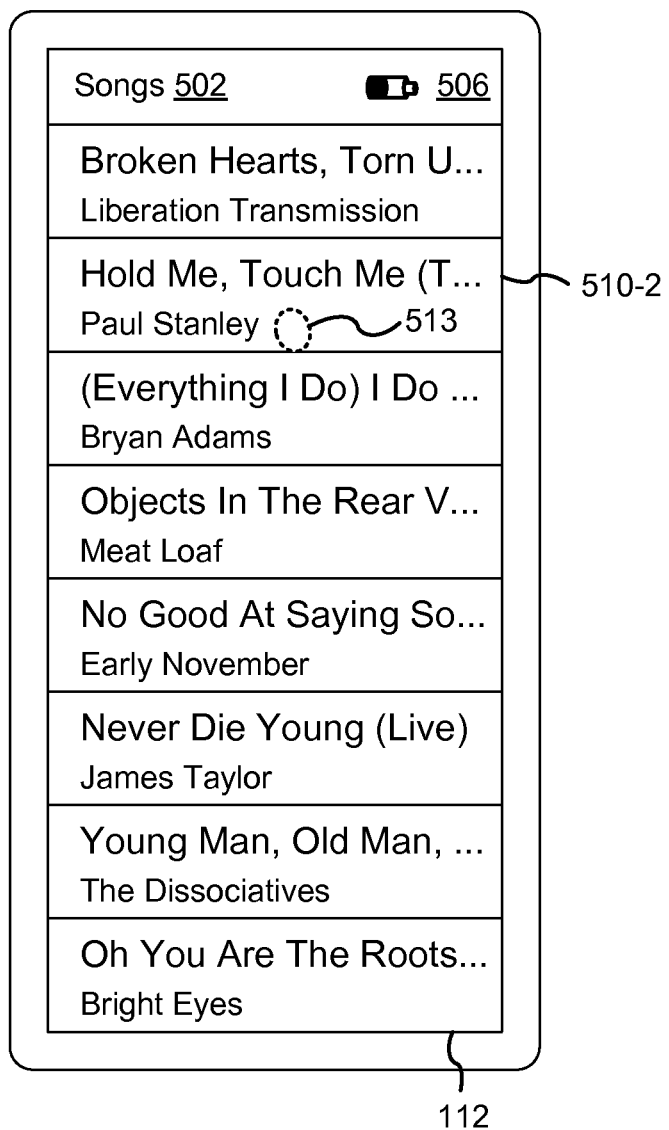
Figure 5P:
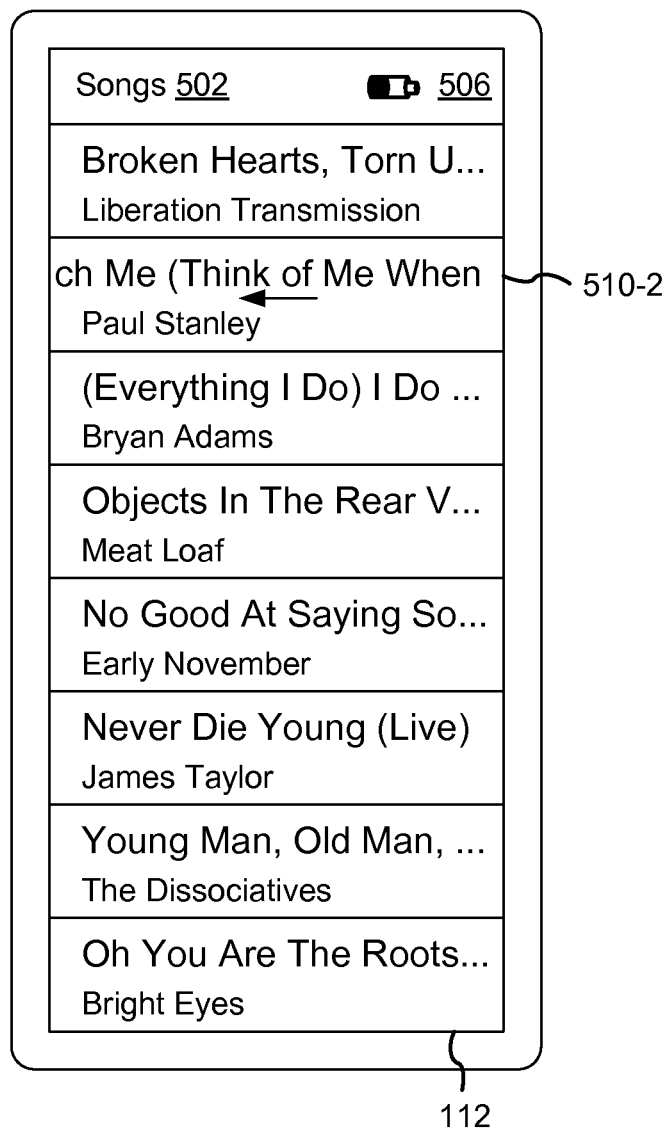
Figure 5Q:
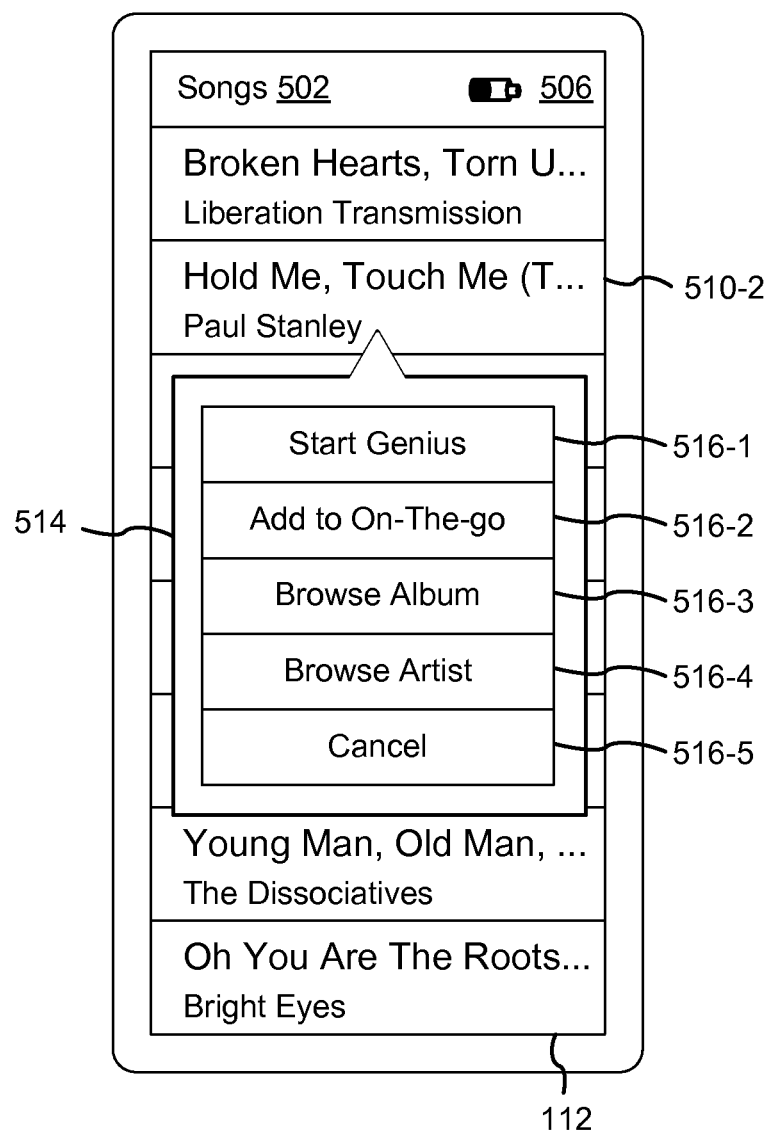
Figure 5R:
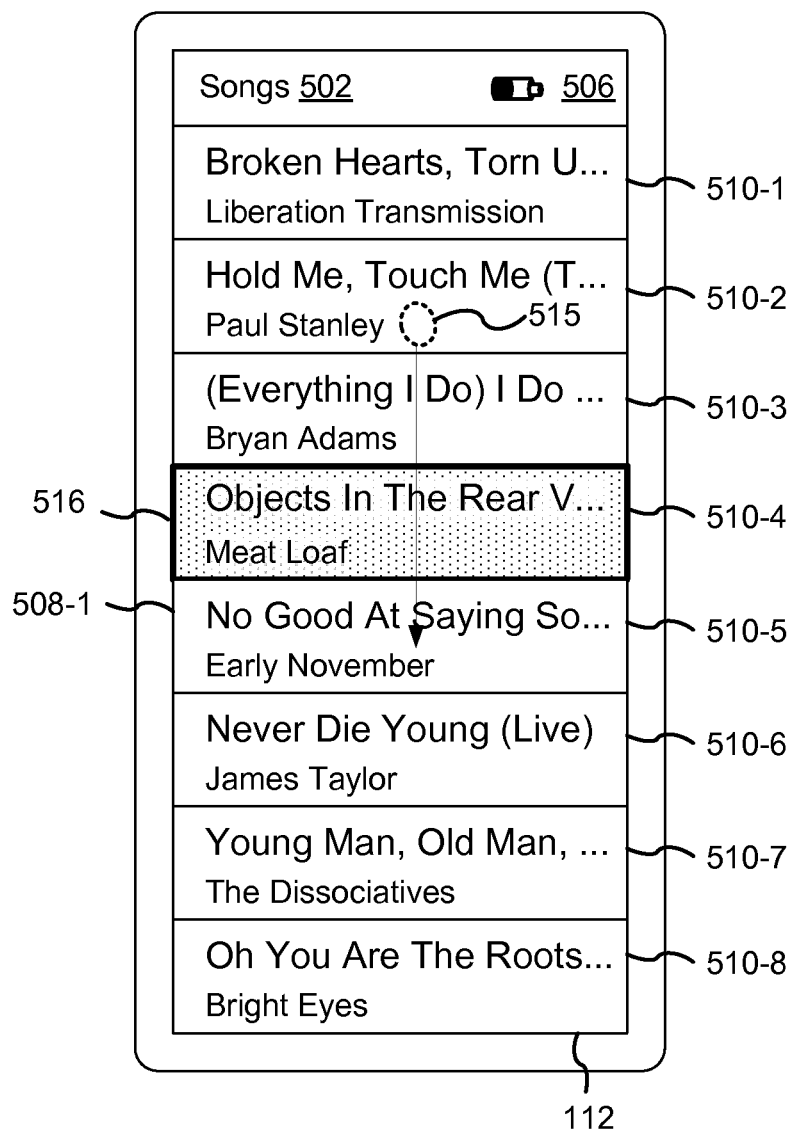
Figure 5S:
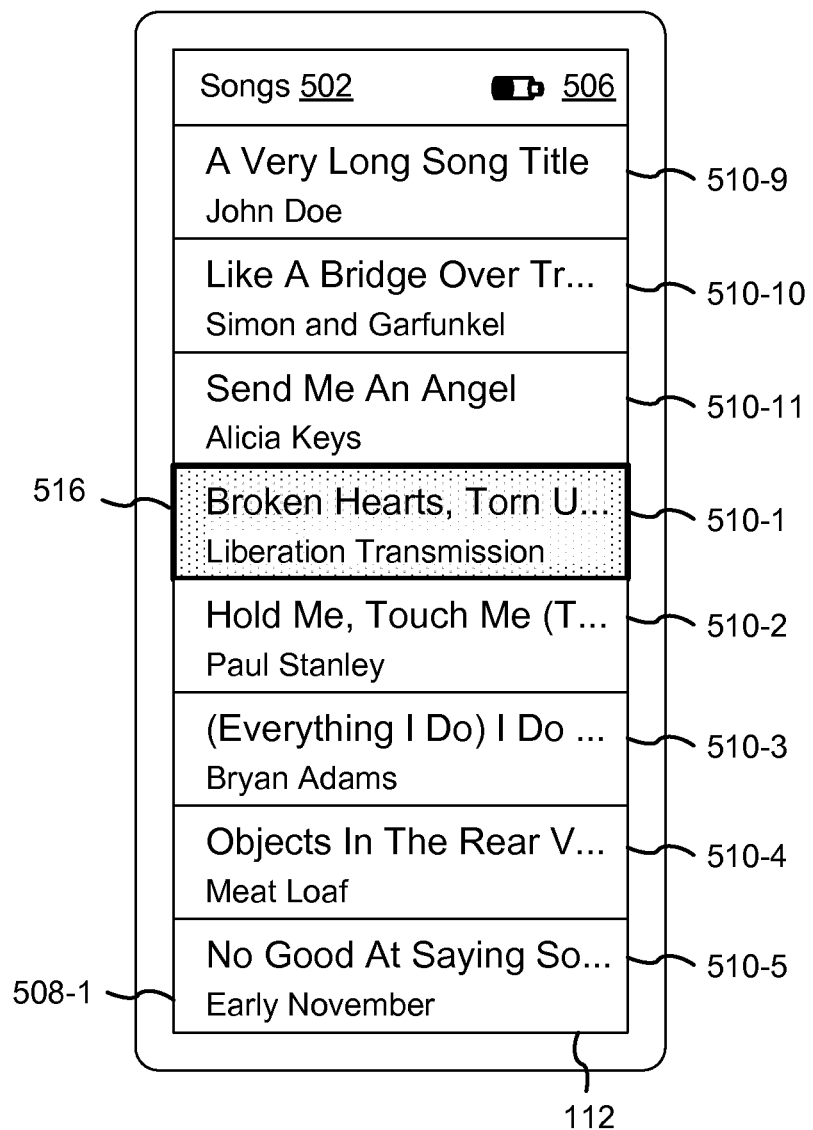
Figure 5T:
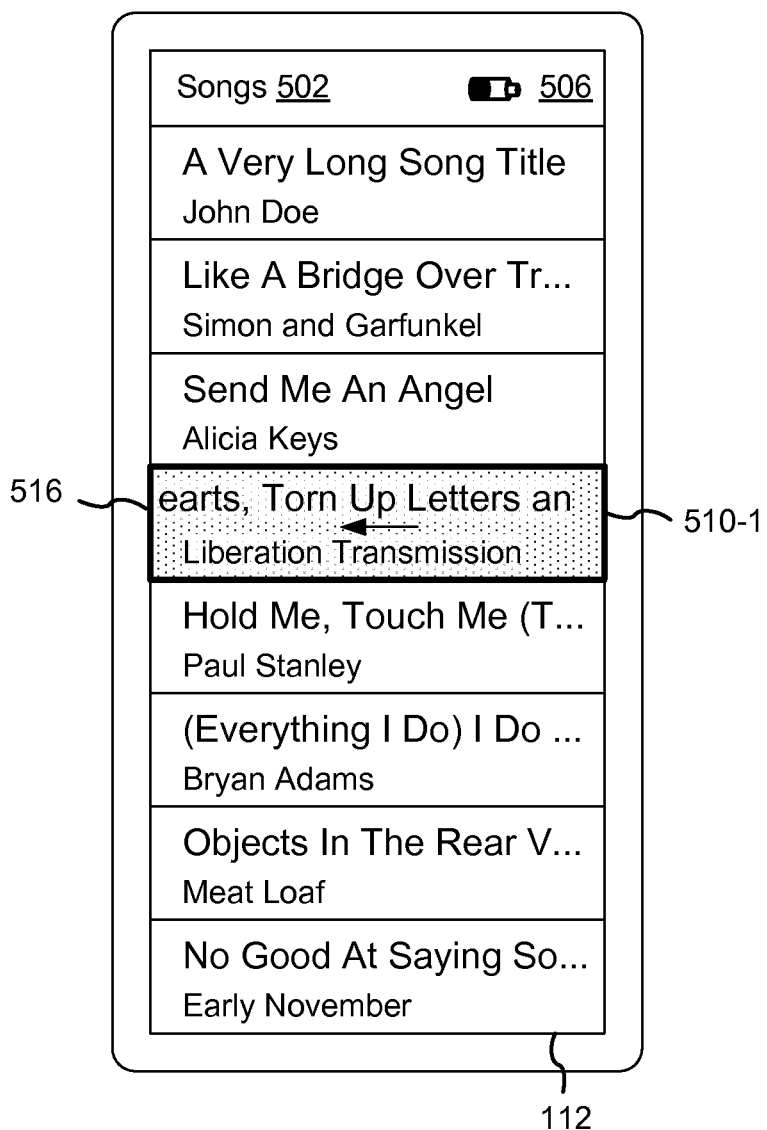
Figure 5U:
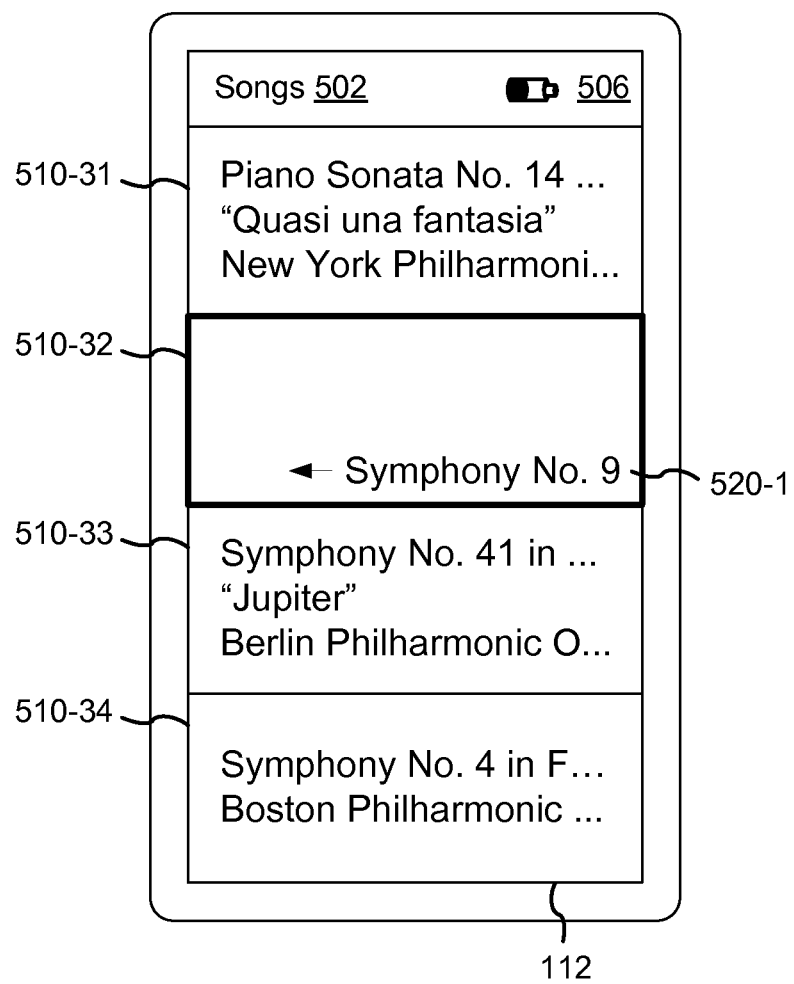
Figure 5V:
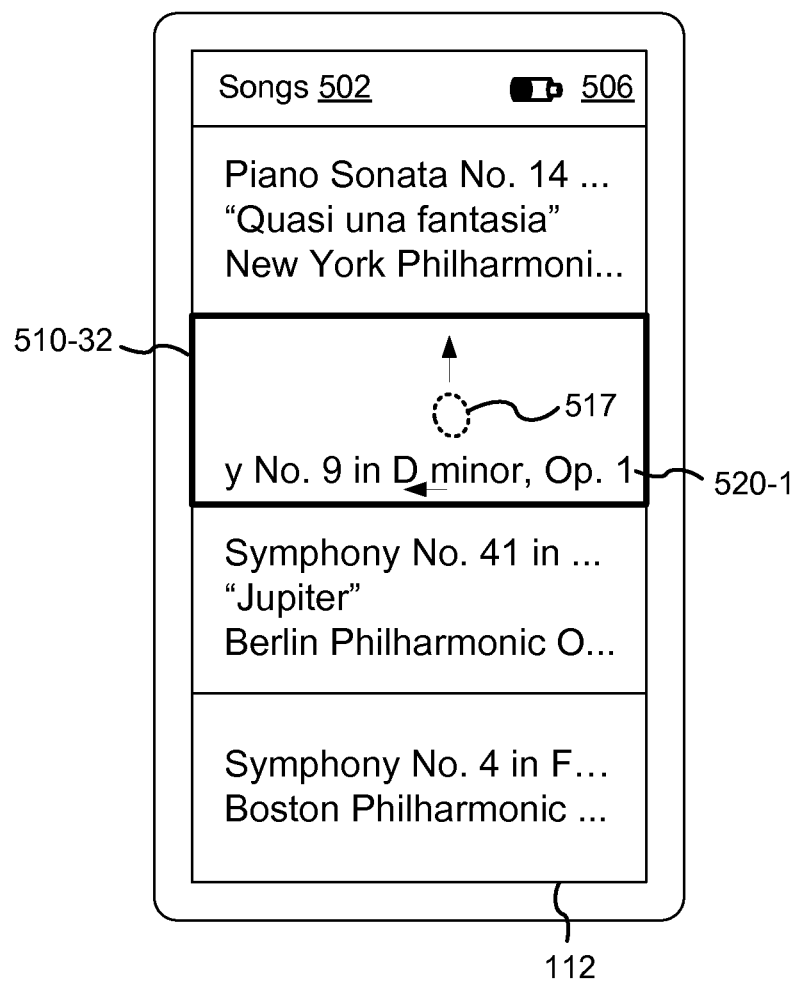
Figure 5W:
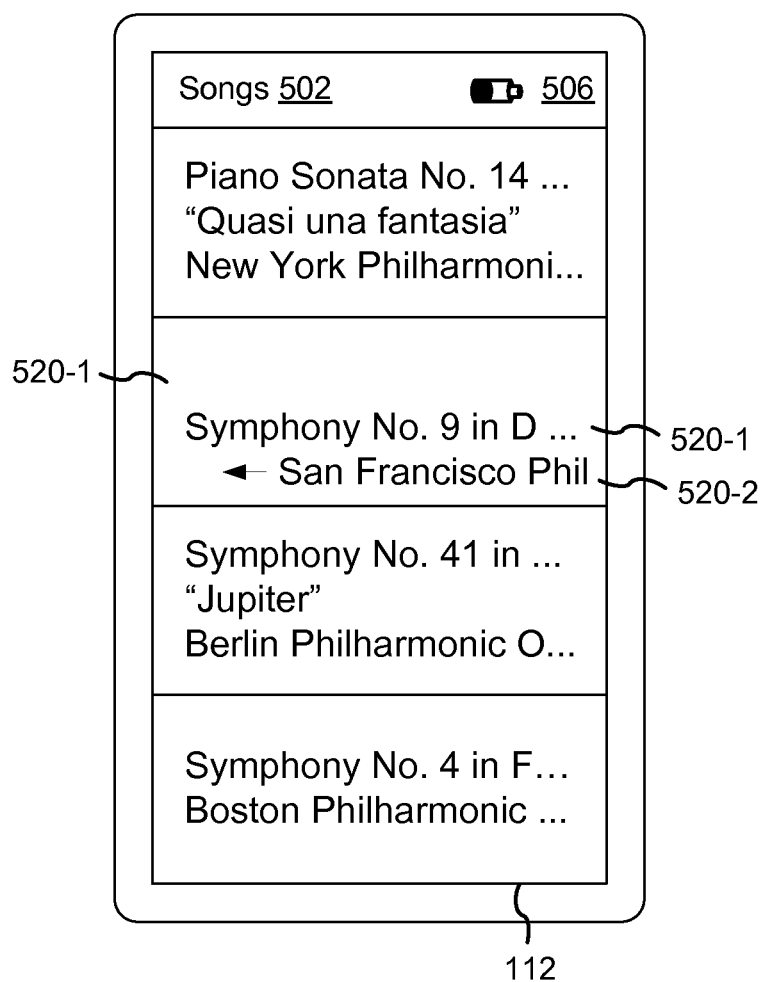
Figure 5X:
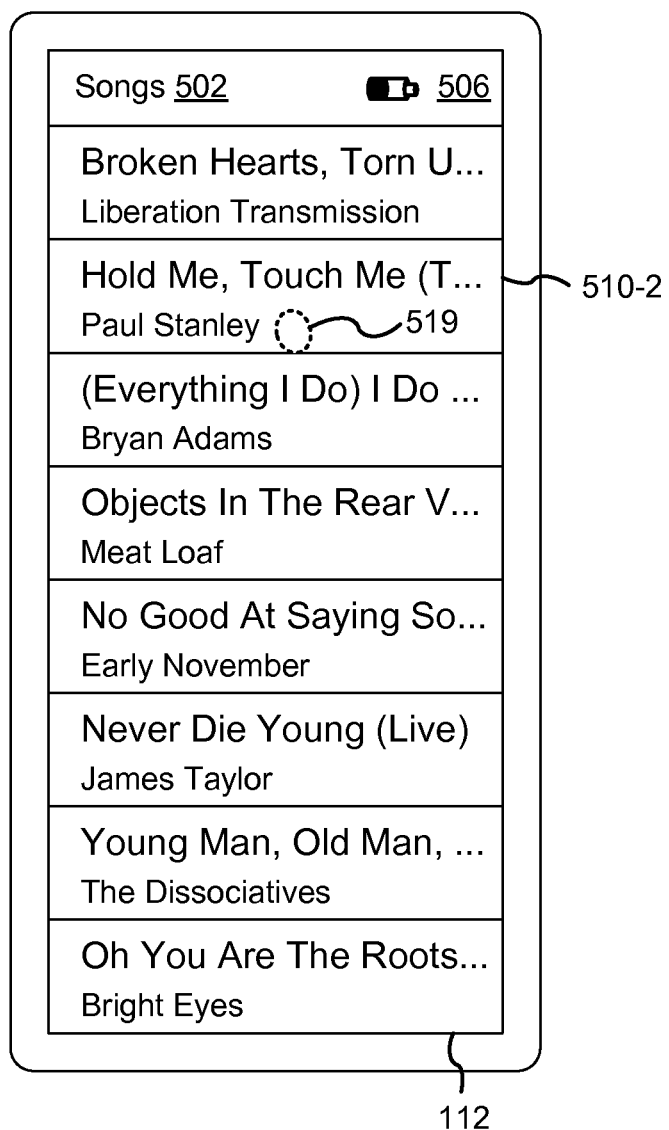
Figure 5Y:
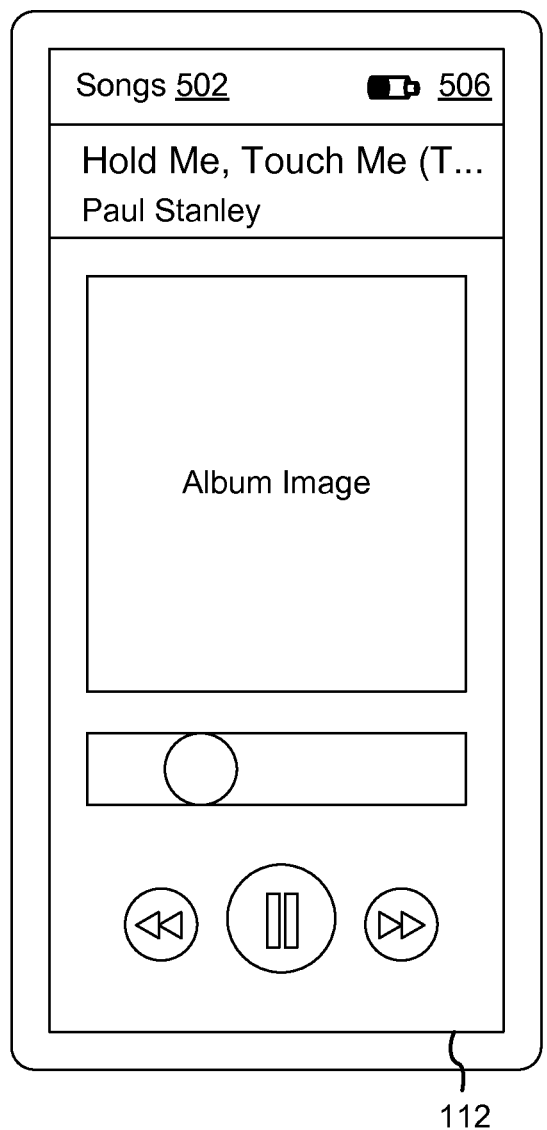

FIGS. 5A-5Y illustrate exemplary user interfaces for marquee scrolling in accordance with some embodiments. The user interfaces in these figures are used to illustrate the processes described below, including the processes in FIGS. 6A-6B, 7, and 8.

In FIGS. 5A-5Y, some movements of finger contacts may be exaggerated for illustrative purposes. No depiction in the figures bearing on movements of finger contacts should be taken as a requirement or limitation for the purpose of understanding sizes and scale associated with the methods and devices disclosed herein.

FIGS. 5A-5C illustrate exemplary user interfaces associated with marquee scrolling within a display in accordance with some embodiments.

FIG. 5A illustrates an exemplary user interface displaying list 508-1 of items 510 on touch screen 112 of a portable electronic device (e.g., portable multifunction device 100). In this example, items 510 in list 508-1 include song information (e.g., song title and artist information).

In FIG. 5A, a finger gesture (e.g., a swipe gesture) is detected on touch screen 112. For example, swipe gesture 505 includes a contact at a location that corresponds to item 510-2. In this example, swipe gesture 505 is a right-to-left swipe gesture (e.g., the contact in swipe gesture 505 moves across touch screen 112 toward a left-hand side of touch screen 112).

The exemplary user interface depicted in FIG. 5A also includes device mode indicator 502 (which indicates the mode of the device, such as music player mode (indicated with a text "songs"), video player mode (which may be indicated, for example, with a text "movie"), etc.) and battery power indicator 506.

FIGS. 5B-5C illustrate that, in response to detecting swipe gesture 505, item 510-2 is marquee scrolled. In FIGS. 5B-5C, the other items 510 in the list besides item 510-2 do not marquee scroll in response to swipe gesture 505. In some embodiments, when item 510 has a plurality of lines, all lines in the plurality of lines are marquee scrolled simultaneously. In some embodiments, only lines that are partially visible on the display (e.g., lines that are wider than the width of the display) are marquee scrolled. In some embodiments, each line in the plurality of lines in each item is marquee scrolled sequentially. In some embodiments, only predefined lines or predefined types of information (e.g., song title) are marquee scrolled.

FIGS. 5B-5C also illustrate that, in some embodiments, the marquee scrolling begins with a speed corresponding to a speed of the movement of contact 505 (represented by a long arrow in FIG. 5B) and decelerates to a predefined marquee scrolling speed (represented by a short arrow in FIG. 5C).

In some embodiments, detecting a contact on touch screen 112 ceases marquee scrolling (not shown). In some embodiments, detecting a contact at a location that corresponds to a marquee scrolling item ceases marquee scrolling of the corresponding item. In some embodiments, marquee scrolling ceases after a predefined number of marquee scrolls (e.g., two marquee scrolls).

FIGS. 5D-5I illustrate exemplary user interfaces responding to a left-to-right gesture (e.g., a pan gesture) in accordance with some embodiments.

In FIG. 5D, a finger gesture (e.g., a pan gesture) is detected on touch screen 112. Pan gesture 507 includes a contact at location 507-A that corresponds to item 510-2. FIG. 5E illustrates a movement of the contact across touch screen 112 to a new location (e.g., 507-B) toward a right-hand side of touch screen 112. A song title in item 510-2 moves in accordance with pan gesture 507. Alternatively, it is also possible to move the entire item 510-2 (e.g., including the song title and artist information) or any other portion in item 510-2 in accordance with pan gesture 507 (not shown).

In FIG. 5F, a termination of pan gesture 507 is detected (e.g., based on detecting a lift-off of the contact). In response, item 510-2 is moved in a marquee scrolling direction (e.g., right-to-left), and subsequently, item 510-2 is marquee scrolled (FIG. 5G). In some embodiments, an item begins its movement in the marquee scrolling direction at a first speed and decelerates to a predefined marquee scrolling speed prior to marquee scrolling of the item. Such deceleration enables a seamless transition from the movement of the item to marquee scrolling. In some embodiments, the first speed is a function of the distance of the item from its original position (e.g., the further the item is moved from its original position, the faster the item initially moves in the marquee scrolling direction). Such a distance-dependent function provides a visual effect that simulates item 510-2 snapping back in the marquee scrolling direction like a rubber band.

FIGS. 5H-5I illustrate an alternative response to the left-to-right pan gesture 507 in accordance with some embodiments. In response to the left-to-right pan gesture 507 (including a movement of contact from 507-A (FIG. 5D) to 507-B' (FIG. 5H)), list 508-1 is scrolled off to a right-hand side of touch screen 112 and a previous screen is displayed, instead of moving or marquee scrolling a single item (e.g., 510-2). In this example, the previous screen includes list 512 of menus and categories of files stored in the portable electronic device (e.g., portable multifunction device 100).

While FIGS. 5A-5I illustrate exemplary user interfaces associated with marquee scrolling of items in English, a left-to-right language, FIGS. 5J-5N illustrate exemplary user interfaces associated with marquee scrolling of items in a right-to-left language. Characters in right-to-left languages (e.g., Arabic, Persian, and Hebrew) are written from a right-hand side of a text to a left-hand side of a text. In FIG. 5J, items 510 (e.g., 510-20 through 510-27) in list 508-2 are written in a right-to-left language.

In FIGS. 5J-5L, exemplary user interfaces in response to a right-to-left swipe gesture are illustrated. In FIG. 5J, the right-to-left swipe gesture 509 is detected on touch screen 112 at a location that corresponds to item 510-27. In response, item 510-27 moves initially in accordance with the direction of the right-to-left swipe gesture 509 (FIG. 5K). Subsequently, item 510-27 ceases the movement in the direction of the right-to-left swipe gesture 509 (e.g., item 510-27 decelerates until the right-to-left movement ceases and then reverses direction). Thereafter, item 510-27 moves in a predefined direction of marquee scrolling, and is marquee scrolled (FIG. 5L). The predefined direction of marquee scrolling for a right-to-left language is left-to-right, and the predefined direction of marquee scrolling for a left-to-right language is right-to-left.

FIGS. 5M-5N illustrate exemplary user interfaces in response to a left-to-right swipe gesture. In FIG. 5M, the left-to-right swipe gesture 511 is detected on touch screen 112 at a location that corresponds to item 510-27. In response, item 510-27 is marquee scrolled (FIG. 5N).

FIGS. 5O-5Q illustrate exemplary responses to a press-and-hold gesture. In FIG. 5O, a press-and-hold gesture 513 is detected on touch screen 112 at a location that corresponds to item 510-2. In FIG. 5P, item 510-2 is marquee scrolled in response to the press-and-hold gesture 513. FIG. 5Q illustrates an alternative response, where contextual menu 514 for item 510-2 is displayed in response to the press-and-hold gesture 513, instead of marquee scrolling item 510-2. In this example, contextual menu 514 includes menu icons 516.

FIGS. 5R-5T illustrate exemplary user interfaces displayed in response to detecting a vertical swipe gesture. In FIG. 5R, a vertical swipe gesture 515 is detected on touch screen 112 at a location corresponding to list 508-1. In FIG. 5S, in response to the vertical swipe gesture 515, list 508-1 is vertically scrolled. Some items (e.g., 510-6, 510-7, and 510-8) in list 508-1 are scrolled off of touch screen 112, and additional items (e.g., 510-9, 510-10, and 510-11) on list 508-1 are displayed.

FIG. 5R also illustrates that in some embodiments, a predefined area (e.g., area 516) of display 112 is visually distinguished from another area of display 112 (e.g., the remainder of the display 112 or the remainder of the list 508). In this example, the visual distinction includes a thicker border and shading, although other methods of visual distinction may be used (e.g., different font type, size, style, and color; different background color; use of symbols or icons; etc.). In FIGS. 5S-5T, because item 510-1 is located in predefined area 516, item 510-1 is marquee scrolled. In FIGS. 5S-5T, the items 510 that are located outside predefined area 516 are not marquee scrolled.

In FIGS. 5U-5W, exemplary user interfaces including items with a plurality of lines are illustrated. Item 510-32 includes at least lines 520-1 and lines 520-2. In FIG. 5U, line 520-1 is marquee scrolled. FIG. 5V illustrates that a bottom-to-top swipe gesture 517 is detected on touch screen 112 at a location corresponding to item 510-32. In FIG. 5W, in response to the bottom-to-top swipe gesture 517, line 520-1 ceases marquee scrolling. Thereafter, at least a portion of line 520-1 is displayed without marquee scrolling, while line 520-2 is displayed with marquee scrolling.

In FIG. 5X, tap gesture 519 is detected on touch screen 112 at a location that corresponds to item 510-2. In response to detecting tap gesture 519, the device plays a song associated with item 510-2 (FIG. 5Y).

Figure 6A:
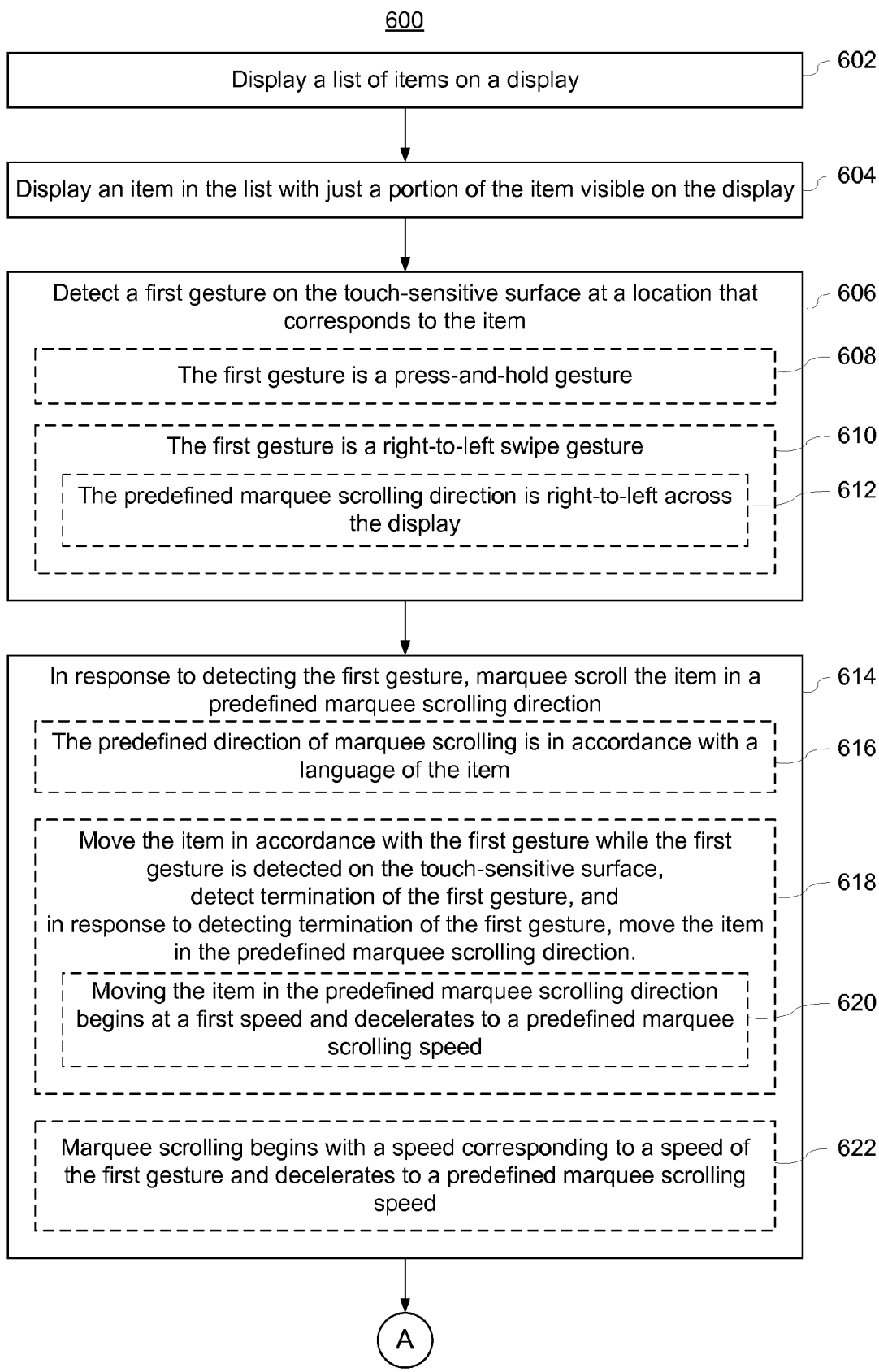
FIGS. 6A-6B are flow diagrams illustrating a method of marquee scrolling in accordance with some embodiments.
Figure 6B:
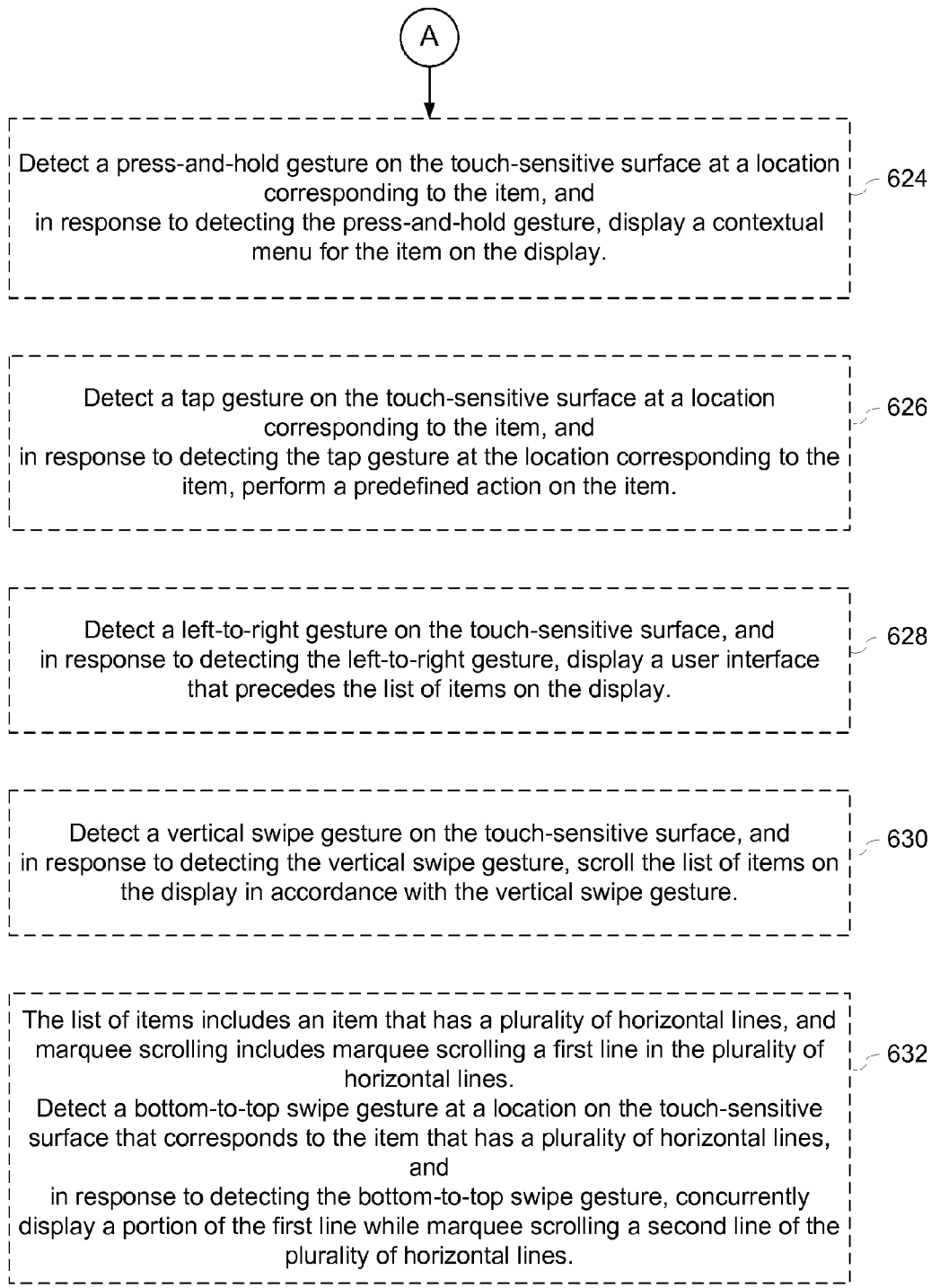

FIGS. 6A-6B are flow diagrams illustrating method 600 of marquee scrolling in accordance with some embodiments. Method 600 is performed at a multifunction device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 600 may be combined and/or the order of some operations may be changed.

As described below, method 600 provides an intuitive way to initiate and control marquee scrolling. The method reduces the cognitive burden on a user when performing marquee scrolling, thereby creating a more efficient human-machine interface. For battery-operated computing devices, enabling a user to perform marquee scrolling faster and more efficiently conserves power and increases the time between battery charges.

The device displays (602) a list (e.g., 508-1) of items (e.g., 510-1 through 510-8 in FIG. 5A) on the display (e.g., touch screen 112). In some embodiments, the list is a vertical list (e.g., 508-1). In some embodiments, the list is a horizontal list. In some embodiments, a respective item in the list includes text (e.g., items 510 in FIG. 5A). In some embodiments, a respective item in the list includes images (not shown).

The device displays (604) an item in the list with just a portion of the item visible on the display. For example, in FIG. 5A, item 510-2 is displayed on touch screen 112 with just a portion of item 510-2 (more specifically, a portion of a song title) visible on the display. In comparison, item 510-6 is displayed in its entirety on touch screen 112.

The device detects (606) a first gesture (e.g., swipe gesture 505 in FIG. 5A or pan gesture 507 in FIG. 5D) on the touch-sensitive surface at a location that corresponds to the item (e.g., 510-2).

In some embodiments, the first gesture is (608) a press-and-hold gesture (e.g., press-and-hold gesture 513 in FIG. 5O). In some embodiments, detecting a press-and-hold gesture (e.g., 513) includes detecting a contact on the touch-sensitive surface for at least a predefined duration (e.g., 0.2-2.0 seconds, preferably 0.8-1.2 seconds) that moves less than a predefined amount (e.g., 1-16 mm or 10-100 pixels, preferably 6 mm or 40 pixels).

In some embodiments, the first gesture is (610) a right-to-left swipe gesture (e.g., gesture 505 in FIG. 5A). In some embodiments, the first gesture is a left-to-right swipe gesture (e.g., gesture 507 in FIG. 5D). In some embodiments, the first gesture is a vertical swipe gesture (e.g., for a vertical marquee scroll, not shown).

In some embodiments, the predefined marquee scrolling direction is (612) right-to-left across the display (e.g., the direction of marquee scrolling of item 510-2 in FIGS. 5B-5C).

In response to detecting the first gesture, the device performs (614) marquee scrolling (i.e., scrolling of text, images and/or other objects as if the objects were on a marquee) of the item in a predefined marquee scrolling direction (e.g., marquee scrolling of item 510-2 in FIGS. 5B-5C). In some embodiments, the device starts marquee scrolling of the item (e.g., item 510-2 in FIGS. 5A-5C) in response to detecting lift-off of the contact in the first gesture. In some embodiments, the device starts marquee scrolling of the item after a predefined time has elapsed since initial detection of the first gesture.

In marquee scrolling, typically, a portion of the item scrolls off toward one side of a display area, and another portion of the item slides in from the opposite side of the display area. In some embodiments, the device marquee scrolls horizontally (e.g., right-to-left or left-to-right) (e.g., FIGS. 5B-5C). In some embodiments, the device marquee scrolls vertically (e.g., top-to-bottom, or bottom-to-top) (not shown). In some embodiments, the device marquee scrolls only selected items (e.g., items that meet a predefined condition, such as an item a detected gesture corresponds to (e.g., item 510-2 in FIGS. 5A-5C)). In some embodiments, the device marquee scrolls only selected portions of one or more items (e.g., song titles, album titles, and/or artist information). For example, in FIGS. 5B-5E, only the song title (or a first line) of item 510-2 is marquee scrolled.

In some embodiments, the predefined direction of marquee scrolling is (616) in accordance with a language of the item. For example, if the language is a left-to-right language (i.e., the language is read left-to-right), the direction of marquee scrolling is right-to-left. If the language is a right-to-left language (i.e., the language is read right-to-left), the direction of marquee scrolling is left-to-right. Exemplary left-to-right languages include languages based on Roman alphabets (e.g., English, French, Spanish, etc.). Exemplary right-to-left languages include Arabic, Persian, and Hebrew. In some embodiments, non-language characters (e.g., symbols) in the item are disregarded in determining the direction of marquee scrolling. In some embodiments, when the item includes multiple languages, the direction of marquee scrolling is determined in accordance with a most frequently used language. In some embodiments, when the item includes multiple languages, the direction of marquee scrolling is determined in accordance with a first used language (e.g., a language used in a first portion of the item). The language(s) of an item can be determined, for example, at least in accordance with one or more fonts used in the item (e.g., Unicode or an international standard, ISO/IEC 10646: Information technology—Universal multiple-octet coded character set (UCS)).

In some embodiments, the device moves (618) the item in accordance with the first gesture while the first gesture is detected on the touch-sensitive surface. In some embodiments, moving the item in accordance with the first gesture includes scrolling the item in the direction of the first gesture (e.g., right-to-left or left-to-right). While the item is being moved, a portion of the item moves off the display. In some embodiments, moving the item includes moving the item when the first gesture moves in a direction opposite to a direction of marquee scrolling. The device detects termination of the first gesture (e.g., detecting lift-off of a finger contact that is used to make the first gesture as in FIGS. 5E-5F). In response to detecting termination of the first gesture, the device moves the item (e.g., item 510-2 in FIG. 5F) in the predefined marquee scrolling direction.

In some embodiments, moving the item in the predefined marquee scrolling direction begins (620) at a first speed (e.g., a long arrow in FIG. 5B indicating the first speed) and decelerates to a predefined marquee scrolling speed (e.g., a short arrow in FIG. 5C indicating the second speed). In some embodiments, moving the item in the predefined marquee scrolling direction begins at the first speed and accelerates to the predefined marquee scrolling speed. In some embodiments, the first speed is a function of the distance of the movement of the item (or the distance of the item from its original position) during the first gesture. For example, the further the item is moved by the first gesture, the faster the item moves initially in the direction of marquee scrolling.

In some embodiments, marquee scrolling begins (622) with a speed corresponding to a speed of the first gesture and decelerates to a predefined marquee scrolling speed. For example, when the first gesture is a swipe gesture (e.g., gesture 505), the beginning speed (indicated by the arrow in FIG. 5B) corresponds to the average speed or the terminal speed of the swipe gesture. In some embodiments, marquee scrolling begins with a speed corresponding to a speed of the first gesture and accelerates to a predefined marquee scrolling speed.

In some embodiments, the device detects a gesture (e.g., a tap gesture) on the touch-sensitive surface at a location corresponding to an item being marquee scrolled. In response to detecting the gesture, the device ceases marquee scrolling of the item (not shown).

In some embodiments, in response to detecting a gesture (e.g., a swipe gesture) on the touch-sensitive surface at a location corresponding to an item being marquee scrolled, the device either accelerates or decelerates a speed of the marquee scrolling. For example, if the swipe gesture is in the direction of the marquee scrolling, the device increases the speed of the marquee scrolling. If the swipe gesture is in the direction opposite to the direction of marquee scrolling, the device decreases the speed of the marquee scrolling. In some embodiments, if the swipe gesture is in a direction perpendicular to the direction of the marquee scrolling, the device ceases the marquee scrolling. In some embodiments, marquee scrolling ceases after a predefined number of marquee scrolls (e.g., two marquee scrolls).

In some embodiments, the device detects (624) a press-and-hold gesture (e.g., gesture 513 in FIG. 5O) on the touch-sensitive surface at a location corresponding to the item. In response to detecting the press-and-hold gesture, the device displays a contextual menu for the item on the display (e.g., contextual menu 514 in FIG. 5Q).

In some embodiments, the device detects (626) a tap gesture (e.g., gesture 519 in FIG. 5X) on the touch-sensitive surface at a location corresponding to the item. In response to detecting the tap gesture at the location corresponding to the item, the device performs a predefined action on the item. For example, if the item is a music item (e.g., a song title), in response to a tap gesture on an item, the device plays a music file that corresponds to the item (e.g., FIG. 5Y).

In some embodiments, the device detects a tap gesture on the touch-sensitive surface at a location distinct from the item that corresponds to a menu bar (not shown). In response to detecting the tap gesture at the location that corresponds to the menu bar, the device displays a menu on the display. In some embodiments, the menu includes a list of additional actions (e.g., go to the "home" screen, display the "root" items, etc.). In some embodiments, the menu includes a list of system operations (e.g., reset an internal clock, turn off the device, change a volume, etc.).

In some embodiments, the device detects a tap gesture on the touch-sensitive surface at a location that corresponds to an icon in a navigation area (e.g., a navigation bar). In response to detecting the tap gesture at the location that corresponds to the icon in the navigation area, the device performs an action that corresponds to the icon in the navigation area. For example, the device displays a previous screen, when a tap gesture is detected on a "back" icon (not shown). The device displays an edit screen when a tap gesture is detected on an "edit" icon (not shown). The device displays a rating screen or menu when a tap gesture is detected on a "rating" icon (not shown).

In some embodiments, the device detects (628) a left-to-right gesture on the touch-sensitive surface (e.g., gesture 507 in FIG. 5D). In response to detecting the left-to-right gesture, the device displays a user interface that precedes the list of items on the display (e.g., list 512 in FIG. 5I). The user interface that precedes the list of items on the display is a screen displayed just before displaying the list of items (in other words, a "previous screen"). In some embodiments, the previous screen includes a list of items or categories at a hierarchical level above a level for the list of items displayed on the display (e.g., list 512 in FIG. 5I). For example, when the list of items includes songs in an album, the previous screen may include a list of albums, including the album to which the displayed songs belong.

In some embodiments, the device detects (630) a vertical swipe gesture (e.g., gesture 515 in FIG. 5R) on the touch-sensitive surface. In response to detecting the vertical swipe gesture, the device scrolls the list of items on the display in accordance with the vertical swipe gesture (e.g., list 508-1 in FIGS. 5R-5S).

In some embodiments, the list of items includes (632) an item that has a plurality of horizontal lines (e.g., item 510-32 in FIGS. 5U-5W having lines 520-1 and 520-2), and marquee scrolling includes marquee scrolling a first line (e.g., line 520-1) in the plurality of horizontal lines. The device detects a bottom-to-top swipe gesture (e.g., gesture 517) at a location on the touch-sensitive surface that corresponds to the item that has a plurality of horizontal lines (e.g., item 510-32). In response to detecting the bottom-to-top swipe gesture, the device concurrently displays a portion of the first line while marquee scrolling a second line of the plurality of horizontal lines (e.g., in FIG. 5W, a portion of line 520-1 is concurrently displayed while line 520-2 is marquee scrolled). In some embodiments, the device concurrently displays the portion of the first line includes ceasing to marquee scroll the first line (e.g., item 520-1 ceases marquee scrolling in FIG. 5W).

Note that details of the processes described above with respect to method 600 are also applicable in an analogous manner to the methods described below, including methods 700 and 800. For brevity, these details are not repeated below.

Figure 7:
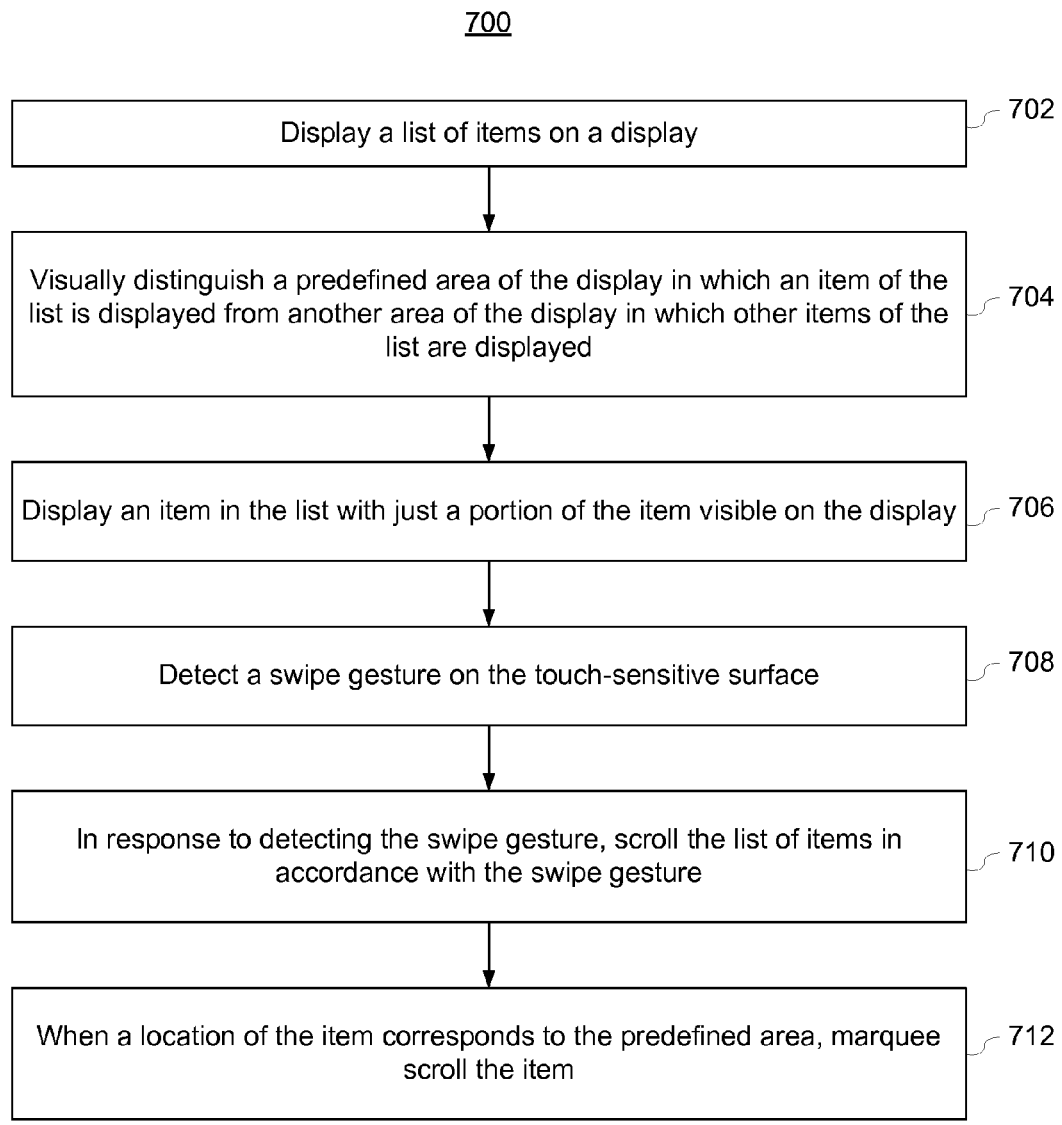
FIG. 7 is a flow diagram illustrating a method of marquee scrolling based on a predefined area in accordance with some embodiments.

FIG. 7 is a flow diagram illustrating method 700 of marquee scrolling based on a predefined area in accordance with some embodiments. Method 700 is performed at a multifunction device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 700 may be combined and/or the order of some operations may be changed.

As described below, method 700 provides an intuitive way to initiate and control marquee scrolling in a predefined area of the display. The method reduces the cognitive burden on a user when performing marquee scrolling, thereby creating a more efficient human-machine interface. For battery-operated computing devices, enabling a user to perform marquee scrolling faster and more efficiently conserves power and increases the time between battery charges.

The device displays (702) a list of items on the display (e.g., list 508-1 in FIG. 5R). In some embodiments, the list is a vertical list (e.g., list 508-1 in FIG. 5R). In some embodiments, the list is a horizontal list (not shown). In some embodiments, a respective item in the list includes text (e.g., item 510-1 in FIG. 5R). In some embodiments, a respective item in the list includes images (not shown).

The device visually distinguishes (704) a predefined area of the display in which an item of the list is displayed from another area of the display in which other items of the list are displayed. For example, in FIG. 5R, item 510-4 of list 508-1 is displayed in predefined area 516, and predefined area 516 is visually distinguished from the area of the display in which other items in the list are displayed (e.g., items 510-1, 510-2, 510-3, 510-5, 510-6, 510-7, and 510-8). The predefined area can be visually distinguished by font size, font color, font style, font type, highlight, area border, area shading, area color, area transparency, background images, and/or background patterns. FIG. 5R shows predefined area 516 in the center of the display. In other embodiments, predefined area 516 is at the top of the display, the bottom of the display, or any other predefined location on the display (not shown).

The device displays (706) an item with just a portion of the item visible on the display (e.g., item 510-1 in FIG. 5R).

The device detects (708) a swipe gesture (e.g., gesture 515 in FIG. 5R) on the touch-sensitive surface.

In response to detecting the swipe gesture, the device scrolls (710) the list of items in accordance with the swipe gesture (e.g., list 508-1 is scrolled in FIGS. 5R-5S). In some embodiments, the device detects a pan gesture and, in response to detecting the pan gesture, scrolls the list of items in accordance with the pan gesture.

When a location of the item corresponds to the predefined area, the device marquee scrolls (712) the item. For example, after the vertical scrolling of the list 508-1 in FIGS. 5R-5S, the location of item 510-1 corresponds to predefined area 516 in FIG. 5S, and the device marquee scrolls item 510-1 in FIG. 5T. In some embodiments, the device marquee scrolls horizontally (e.g., right-to-left, or left-to-right) (e.g., item 510-1 in FIG. 5T). In some embodiments, the device marquee scrolls vertically (not shown).

Figure 8:
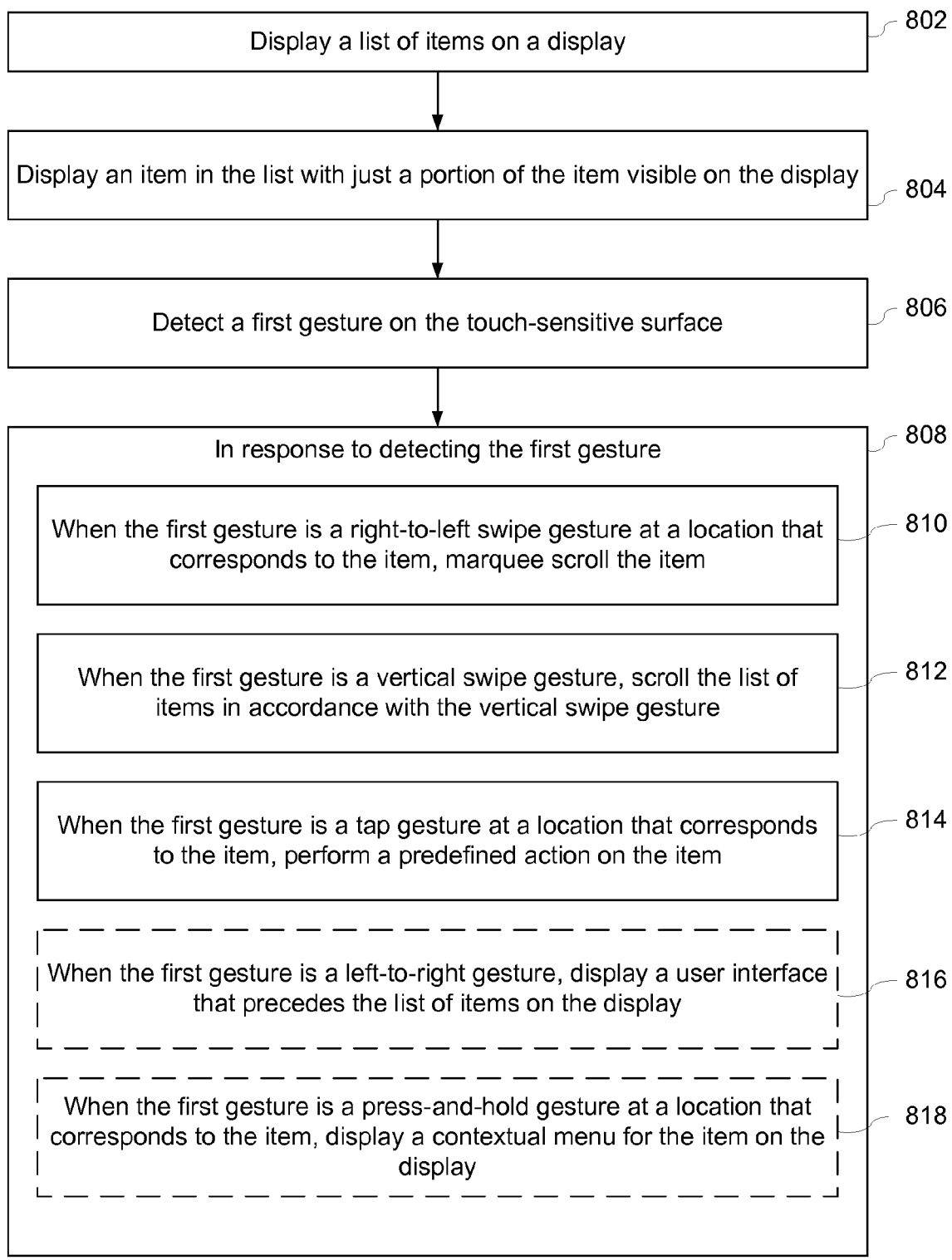
FIG. 8 is a flow diagram illustrating a method of manipulating a list of items with gestures in accordance with some embodiments.

FIG. 8 is a flow diagram illustrating method 800 of manipulating a list of items with gestures in accordance with some embodiments. Method 800 is performed at a multifunction device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 800 may be combined and/or the order of some operations may be changed.

As described below, method 800 provides an intuitive way to manipulate a list of items based on a set of touch gestures. The method reduces the cognitive burden on a user when interacting with a list of items, thereby creating a more efficient human-machine interface. For battery-operated computing devices, enabling a user to manipulate a list of items faster and more efficiently conserves power and increases the time between battery charges.

The device displays (802) a list of items on the display (e.g., list 508-1 in FIG. 5A). In some embodiments, the list is a vertical list (e.g., list 508-1). In some embodiments, the list is a horizontal list (not shown). In some embodiments, a respective item in the list includes text (e.g., item 510-1 includes text). In some embodiments, a respective item in the list includes images (not shown).

The device displays (804) an item in the list with only a portion of the item visible on the display (e.g., only a portion of item 510-2 is displayed in FIG. 5A).

The device detects (806) a first gesture (e.g., gesture 505 in FIG. 5A) on the touch-sensitive surface.

In response to detecting the first gesture (808), the device performs one of the following actions. When the first gesture is a right-to-left swipe gesture (e.g., gesture 505) at a location that corresponds to the item, the device marquee scrolls (810) the item (e.g., item 510-2 in FIGS. 5A-5C). In some embodiments, the device starts marquee scrolling of the item (e.g., item 510-2 in FIGS. 5A-5C) in response to detecting lift-off of the contact in the first gesture. In some embodiments, the device starts marquee scrolling of the item after a predefined time has elapsed since initial detection of the first gesture.

When the first gesture is a vertical swipe gesture (e.g., gesture 515 in FIG. 5R), the device scrolls (812) the list of items in accordance with the vertical swipe gesture (list 508-1 in FIG. 5R).

When the first gesture is a tap gesture (e.g., gesture 519 in FIG. 5X) at a location that corresponds to the item, the device performs (814) a predefined action on the item (e.g., playing a music file associated with the item, as illustrated in FIG. 5Y).

In some embodiments, when the first gesture is a left-to-right gesture (e.g., gesture 507 in FIG. 5D), the device displays (816) a user interface that precedes the list of items on the display (e.g., list 512 in FIGS. 5H-5I).

In some embodiments, when the first gesture is a press-and-hold gesture (e.g., gesture 513 in FIG. 5O) at a location that corresponds to the item, the device displays (818) a contextual menu for the item on the display (e.g., contextual menu 514 in FIG. 5Q).

In some embodiments, when the first gesture is a swipe gesture, the device performs an action based on an initial angle of movement of a contact in the swipe gesture (which corresponds to an initial direction of movement of the contact in the swipe gesture), independent of subsequent movement of the contact in the swipe gesture. For example, if the initial angle is closer to a right-to-left horizontal direction, the device marquee scrolls a corresponding item, without vertically scrolling the list of items, even if there is some subsequent vertical movement of the contact in the swipe gesture. If the initial angle is closer to a vertical direction, the device scrolls the list of items, without marquee scrolling an item in the list, even if there is some subsequent horizontal movement of the contact in the swipe gesture.

In some embodiments, the device marquee scrolls the item when the initial angle is within a predefined range (e.g., 10°, 15°, 20°, 25°, or 30°) from a horizontal direction (e.g., a right-to-left horizontal direction). The device may scroll the list of items when the initial angle is outside the predefined range from the horizontal direction (e.g., outside a fifteen degree range), thereby making it easier to scroll the list of items than to marquee scroll an individual item. In some embodiments, the device scrolls the list of items if the initial angle is within a predefined range (e.g., 10°, 15°, 20°, 25°, or 30°) from a vertical direction.

The operations in the information processing methods described above may be implemented by running one or more functional modules in information processing apparatus such as general purpose processors or application specific chips. These modules, combinations of these modules, and/or their combination with general hardware (e.g., as described above with respect to FIGS. 1A, 1B and 3) are all included within the scope of protection of the invention.

The operations described above with reference to FIGS. 6A-6B, 7, and 8 may be implemented by components depicted in FIGS. 1A-1C. For example, detection operation 606, marquee scrolling operation 614, and moving operations 618 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection or dragging of an object on a user interface. When a respective predefined event or sub-event is detected, event recognizer 180 activates an event handler 190 associated with the detection of the event or sub-event. Event handler 190 may utilize or call data updater 176, object updater 177 or GUI updater 178 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1C.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A portable electronic device, comprising:
   a display and a touch-sensitive surface;
   one or more processors;
   memory; and
   one or more programs, wherein the one or more programs are stored in the memory and configured to be executed by the one or more processors, the one or more programs including instructions for:
     displaying a list of items on the display;
     visually distinguishing a predefined area of the display in which an item of the list is displayed from another area of the display in which other items of the list are displayed;
     displaying an item with just a portion of the item visible on the display;
     detecting a swipe gesture on the touch-sensitive surface;
     in response to detecting the swipe gesture, scrolling the list of items in accordance with the swipe gesture; and
     when a location of the item corresponds to the predefined area, marquee scrolling the item.

2. A portable electronic device, comprising:
   a display and a touch-sensitive surface;
   one or more processors;
   memory; and
   one or more programs, wherein the one or more programs are stored in the memory and configured to be executed by the one or more processors, the one or more programs including instructions for:
     displaying a list of items on the display;
     displaying an item in the list with only a portion of the item visible on the display;
     detecting a first gesture on the touch-sensitive surface;
     in response to detecting the first gesture:
       when the first gesture is a right-to-left swipe gesture at a location that corresponds to the item, marquee scrolling the item;
       when the first gesture is a vertical swipe gesture, scrolling the list of items in accordance with the vertical swipe gesture; and
       when the first gesture is a tap gesture at a location that corresponds to the item, performing a predefined action on the item.

3. The device of claim 2, including instructions for:
   in response to detecting the first gesture:
     when the first gesture is a left-to-right gesture, displaying a user interface that precedes the list of items on the display.

4. The device of claim 2, including instructions for:
   in response to detecting the first gesture:
     when the first gesture is a press-and-hold gesture at a location that corresponds to the item, displaying a contextual menu for the item on the display.

5. A non-transitory computer readable storage medium storing one or more programs, the one or more programs comprising instructions, which when executed by a portable electronic device with a display and a touch-sensitive surface, cause the device to:
   display a list of items on the display;
   display an item in the list with only a portion of the item visible on the display;
   detect a first gesture on the touch-sensitive surface;
   in response to detecting the first gesture:
     when the first gesture is a right-to-left swipe gesture at a location that corresponds to the item, marquee scroll the item;
     when the first gesture is a vertical swipe gesture, scroll the list of items on the display in accordance with the vertical swipe gesture; and
     when the first gesture is a tap gesture at a location that corresponds to the item, perform a predefined action on the item.

6. The non-transitory computer readable storage media of claim 5, including instructions which cause the device to:
   in response to detecting the first gesture:
     when the first gesture is a left-to-right gesture, display a user interface that precedes the list of items on the display.

7. The non-transitory computer readable storage media of claim 5, including instructions which cause the device to:
   in response to detecting the first gesture:
     when the first gesture is a press-and-hold gesture at a location that corresponds to the item, display a contextual menu for the item on the display.

8. A method, comprising:
   at a portable electronic device with a display and a touch-sensitive surface:
     displaying a list of items on the display;
     visually distinguishing a predefined area of the display in which an item of the list is displayed from another area of the display in which other items of the list are displayed;
     displaying an item with just a portion of the item visible on the display;
     detecting a swipe gesture on the touch-sensitive surface;
     in response to detecting the swipe gesture, scrolling the list of items in accordance with the swipe gesture; and
     when a location of the item corresponds to the predefined area, marquee scrolling the item.

9. A non-transitory computer readable storage medium storing one or more programs, the one or more programs comprising instructions, which when executed by a portable electronic device with a display and a touch-sensitive surface, cause the device to:

display a list of items on the display;
visually distinguish a predefined area of the display in which an item of the list is displayed from another area of the display in which other items of the list are displayed;
display an item with just a portion of the item visible on the display;
detect a swipe gesture on the touch-sensitive surface;
in response to detecting the swipe gesture, scroll the list of items in accordance with the swipe gesture; and
when a location of the item corresponds to the predefined area, marquee scroll the item.

10. A method, comprising:
at a portable electronic device with a display and a touch-sensitive surface:
   displaying a list of items on the display;
   displaying an item in the list with only a portion of the item visible on the display;
   detecting a first gesture on the touch-sensitive surface;
   in response to detecting the first gesture:
      when the first gesture is a right-to-left swipe gesture at a location that corresponds to the item, marquee scrolling the item;
      when the first gesture is a vertical swipe gesture, scrolling the list of items in accordance with the vertical swipe gesture; and
      when the first gesture is a tap gesture at a location that corresponds to the item, performing a predefined action on the item.

11. The method of claim 10, further including:
in response to detecting the first gesture:
   when the first gesture is a left-to-right gesture, displaying a user interface that precedes the list of items on the display.

12. The method of claim 10, further including:
in response to detecting the first gesture:
   when the first gesture is a press-and-hold gesture at a location that corresponds to the item, displaying a contextual menu for the item on the display.

* * * * *